United States Patent [19]
Inschlag

[11] Patent Number: 6,151,440
[45] Date of Patent: Nov. 21, 2000

[54] ARRANGEMENT FOR SEGMENT-BY-SEGMENT RECORDING OF INFORMATION SIGNALS ON AN INTERMITTENTLY DRIVABLE MAGNETIC TAPE

[75] Inventor: Josef Inschlag, Bruck an der Lafnitz, Austria

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/838,484

[22] Filed: Apr. 7, 1997

[30] Foreign Application Priority Data

Apr. 23, 1996 [EP] European Pat. Off. .............. 96890072

[51] Int. Cl.$^7$ ...................................................... H04N 5/91
[52] U.S. Cl. ................................ 386/78; 386/79; 386/80; 360/74.1; 360/74.4
[58] Field of Search .................................. 386/46, 45, 68, 386/69, 70, 80, 81, 82, 78, 85–88; 360/69, 72.1, 72.3, 31, 52, 71, 74.1, 74.4

[56] References Cited

U.S. PATENT DOCUMENTS 4,805,053  2/1989  Yamanake et al. ..................... 360/72.3
5,067,030  11/1991  Kuchar .
5,654,946  8/1997  Kim et al. ............................... 360/72.1
5,930,447  7/1999  Shintani .................................... 386/68

FOREIGN PATENT DOCUMENTS

3916379C3  11/1989  Germany .

*Primary Examiner*—Wendy Garber
*Assistant Examiner*—Christopher Onuaku
*Attorney, Agent, or Firm*—Edward W. Goodman

[57] ABSTRACT

In an arrangement (1) for the segment-by-segment recording of information signals by at least one rotationally drivable magnetic head (4, 5) in inclined recording tracks (2) on a magnetic tape (3) which can be driven intermittently by a tape drive device (53) while the recording mode is active, the stationary magnetic tape (3) is scanned along an inclined reproducing track (75) which partly overlaps the inclined recording track last scanned ($2_n$) and the information signal segment (field signal) recorded in the inclined recording track ($2_n$) is then reproduced. The arrangement includes structure for determining the instantaneous relative position of the inclined reproducing track (75), in the longitudinal direction of the tape, with respect to the inclined recording track ($2_n$), which is partly overlapped by the inclined reproducing track (75), and for generating position information (LI). The arrangement also includes structure for controlling, in dependence upon this position information (LI), the tape drive device (53) during a subsequent recording cycle.

6 Claims, 7 Drawing Sheets

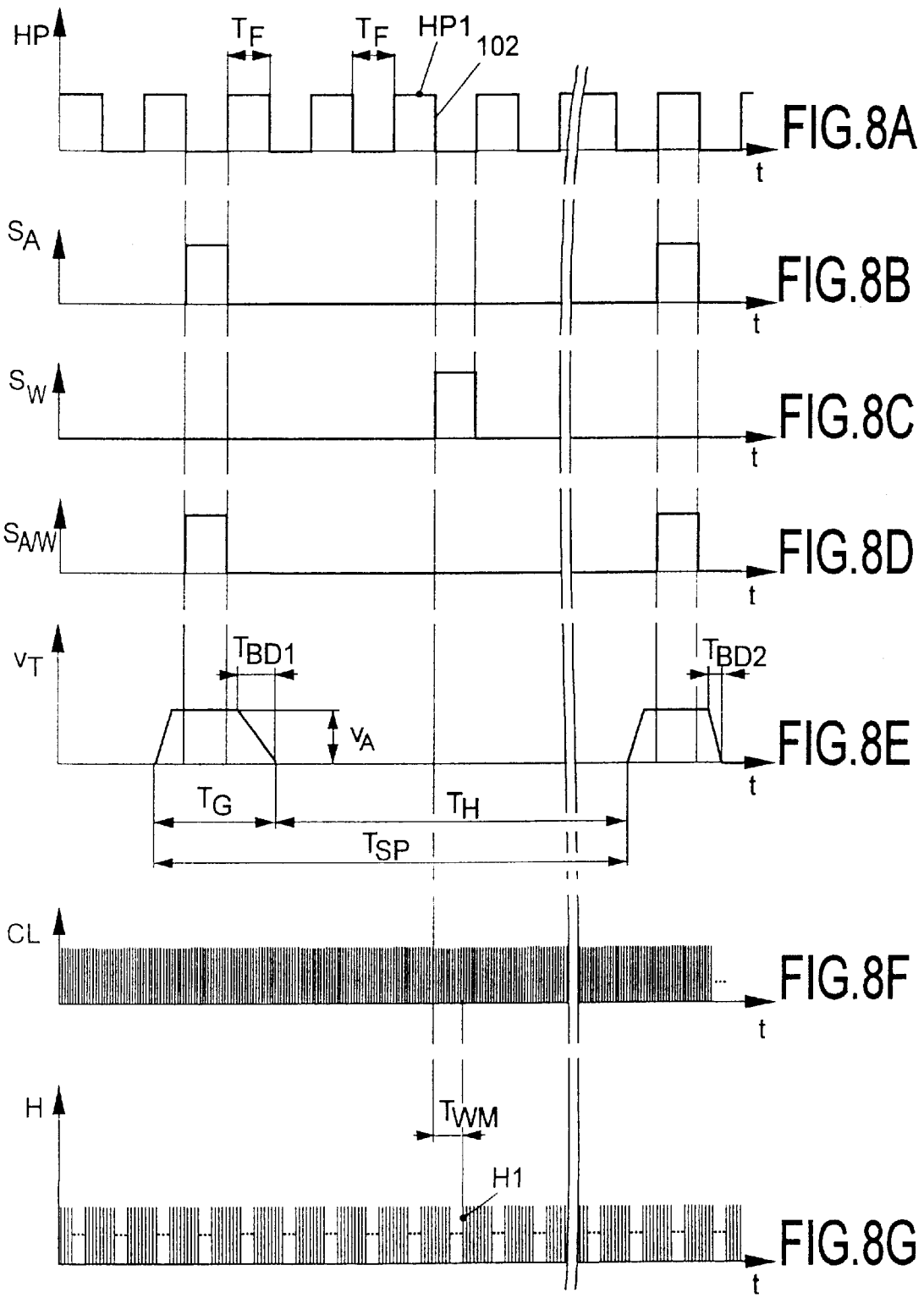

ARRANGEMENT FOR SEGMENT-BY-SEGMENT RECORDING OF INFORMATION SIGNALS ON AN INTERMITTENTLY DRIVABLE MAGNETIC TAPE

BACKGROUND OF THE INVENTION

1. Field of the Invention

The invention relates to an arrangement for recording information signals in recording tracks on a magnetic tape and comprising at least one rotationally drivable magnetic head for scanning inclined recording tracks on the magnetic tape, and a tape drive device for intermittently driving the magnetic tape in a longitudinal direction of the tape, in which, for recording an information signal segment by the magnetic head in an inclined recording track during a recording cycle, the magnetic tape is accelerated from standstill to a given recording tape speed and is subsequently driven at the recording tape speed for at least the duration of the recording of the information signal segment, and is then subsequently braked to standstill, and in which, after completion of a recording cycle, the stationary magnetic tape is scanned by the magnetic head along an inclined reproducing track which partly overlaps the inclined recording track last scanned, and the information signal segment recorded in the inclined recording track last scanned is reproduced.

2. Description of the Related Art

Such an arrangement of the type defined in the opening paragraph is known, for example, from German Patent DE 39 16 379 C3, the known arrangement being a video recorder by means of which so-termed "time-lapse" operation is possible.

A problem encountered with such an arrangement of the type defined in the opening paragraph, is that when braked to standstill, the magnetic tape is tensioned due to mechanical effects and slackens after braking, so that the magnetic tape, particularly in the area scanned by the rotationally drivable magnetic head, moves slightly backward in the longitudinal direction of the tape, as a result of which an inclined recording track, which is subsequently scanned for recording a further information signal segment, such as a video field signal, in the longitudinal direction of the tape, may be situated at a distance from the inclined recording signal track last scanned during the recording of the information signal segment last recorded, this distance not being in conformity with a predetermined nominal value, and depending on the conditions during braking and slackening of the magnetic tape. In particular, said distance also depends on temperature influences, aging influences of the mechanical parts which cooperate with the magnetic tape, such as the tape-drive capstan, tape guides and the like, and humidity influences, as well as on the magnetic tape and a cassette containing the magnetic tape used in each case. Such deviations of the distances between successive inclined recording tracks in the longitudinal direction of the tape from said nominal value, has the drawback that they give rise to disturbances during a subsequent reproduction of the information signal segments recorded in all these inclined recording tracks, which is undesirable.

In order to minimize such deviations of the distances between successive inclined recording tracks in the longitudinal direction, in an arrangement whose tape drive device comprises a motor-driven capstan disposed downstream the rotationally drivable magnetic head in the longitudinal of the tape, for intermittently driving the magnetic tape, against which capstan the magnetic tape can be pressed by means of a tape pressure roller, it is possible to brake the capstan continually by means of a mechanical additional brake, which prevents the magnetic tape retained between the capstan, which is braked by means of the additional brake, and the pressure roller from moving back after braking of the capstan has ceased. However, such a constantly operative additional brake has the drawback that it constitutes a permanent mechanical load to be overcome by the capstan drive and, therefore, requires a proportionately more powerful drive motor for driving the capstan.

In order to minimize such deviations of the distances between successive inclined recording tracks in the longitudinal direction, in an arrangement whose tape drive device comprises a motor-driven capstan disposed downstream the rotationally drivable magnetic head in the longitudinal of the tape, for intermittently driving the magnetic tape, against which capstan the magnetic tape can be pressed by means of a tape pressure roller, it is alternatively possible to couple a so-termed bi-directional tacho-generator to the tape-drive capstan, by means of which, in the case of a backward movement of the magnetic tape as a result of slackening, as explained hereinbefore, a number of tacho-pulses is generated which corresponds to the length of the moved-back tape and which is detected by means of a counting device, the detected number of tacho-pulses being taken into account in driving the magnetic tape when the magnetic tape is accelerated by means of the capstan during a subsequent recording cycle to record a further field signal. The provision of such a bi-directional tacho-generator and such a counting device has the drawback that this requires additional parts which make such an arrangement more expensive.

SUMMARY OF THE INVENTION

It is an object of the invention to preclude the aforementioned problems in an arrangement of the type defined in the opening paragraph and to improve an arrangement of the type defined in the opening paragraph in a simple manner and substantially without any additional material means, so as to obtain an improved arrangement in which the distances between successive inclined recording tracks in the longitudinal direction, at least on an average, correspond to a nominal value.

This object is achieved in an arrangement of the type defined in the opening paragraph, characterized in that the arrangement comprises first means for determining the instantaneous relative position of the inclined reproducing track, in the longitudinal direction of the tape, with respect to the inclined recording track last scanned, which is partly overlapped by the inclined reproducing track, the first means generating position information representative of the relative position thus determined, and second means, to which the position information is applied, for controlling, in dependence upon this position information, the tape drive device during a subsequent recording cycle for recording an information signal segment in an inclined recording track.

By means of the measures in accordance with the invention, it is achieved, in a particularly simple manner and substantially without any material means, that, after each recording of an information signal segment in an inclined recording track, for which the stationary magnetic tape is scanned by the at least one rotationally drivable magnetic head along an inclined reproducing track which at least partly overlaps the inclined recording track last scanned, and the information signal segment recorded in the inclined recording track last scanned is reproduced when a reproduction mode is active, and from the information signal components—such as, for example, a special marking signal or identification signal inserted in an information signal segment during the recording of this segment—which are reproduced from the inclined recording track last scanned and which are partly overlapped by the inclined reproducing track during scanning of the inclined reproducing track, information is derived about the relative position between the inclined reproducing track and the inclined recording track last scanned and, consequently, about the relative position of the magnetic tape with respect to the at least one rotationally drivable magnetic head, and hence, about the actual braking conditions during braking of the magnetic tape, and which is subsequently used to control the tape drive device in a subsequent recording cycle for recording an information signal segment in such a manner that, eventually, a track spacing between successive inclined recording tracks is obtained which, at least on an average, corresponds to a predetermined nominal value. Thus, it is achieved, in an advantageous manner, that, during a subsequent reproduction of the information signal segments recorded in all the successive inclined recording tracks, no disturbances occur as a result of excessive deviations of the distances between successive inclined recording tracks in the longitudinal direction of the tape.

In an arrangement in accordance with the invention, which is adapted to record information signals formed by video signals, as is known per se from the aforementioned German Patent DE 39 16 379 C3, it has proven to be advantageous if the first means includes time measuring means for determining a measurement value which corresponds to the time interval between a head switch pulse edge of a head switch pulse, appearing at the beginning of a scan of an inclined reproducing track, and a line pulse edge of a line pulse reproduced from the inclined recording track which is partly overlapped by the inclined reproducing track, and the first means further includes comparison means for comparing the measurement value determined by the time measuring means with a nominal value corresponding to a nominal time interval, and for generating, in dependence upon the comparison result, the position information representative of the relative position of the inclined reproducing track in the longitudinal direction of the tape with respect to the inclined recording track, which is partly overlapped by the inclined reproducing track. Such an arrangement advantageously utilizes the fact that the time interval between a head switch pulse edge, appearing when scanning of an inclined reproducing track begins, and a line pulse edge of a line pulse reproduced from the inclined recording track last scanned, which is partly overlapped by the inclined reproducing track, corresponds to a predetermined known nominal value, when, after braking during a recording cycle for recording a video signal segment forming an information signal segment, such as a field signal, the magnetic tape has a nominal relative position with respect to the at least one rotationally drivable magnetic head. A further advantage is that a very simple implementation is possible because the head switch pulses, which are available anyway in such an arrangement, can also be used for the measures and goals in accordance with the invention.

However, in an arrangement in accordance with the invention, which is adapted to record information signals formed by video signals, as is known per se from the aforementioned German Patent DE 39 16 379 C3, it has also proven to be advantageous if the rotationally drivable magnetic head is coupled to a sensor device for generating at least one sensor pulse per revolution of the magnetic head, and the first means includes time measuring means for determining a measurement value corresponding to the time interval between a sensor pulse edge of a sensor pulse, which appears during scanning of an inclined reproducing track, and a line pulse edge of a line pulse reproduced from the inclined recording track which is partly overlapped by the inclined reproducing track, and the first means further includes comparison means for comparing the measurement value determined by the time measuring means with a nominal value corresponding to a nominal time interval, and for generating, in dependence upon the comparison result, the position information representative of the relative position of the inclined reproducing track in the longitudinal direction of the tape with respect to the inclined recording track which is partly overlapped by the inclined reproducing track. Such an arrangement advantageously utilizes the fact that the time interval between a sensor pulse edge of a sensor pulse, appearing when an inclined reproducing track is scanned, and a line pulse edge of a line pulse reproduced from the inclined recording track last scanned, which is partly overlapped by the inclined reproducing track, corresponds to a predetermined known nominal value, when, upon braking after recording of a video signal segment forming an information signal segment, such as a field signal, the magnetic tape occupies a nominal relative position with respect to the rotationally drivable magnetic head. A further advantage is that speed fluctuations of the at least one rotationally drivable magnetic head during scanning of an inclined reproducing track in order to reproduce the line pulses recorded in the inclined recording track, which is partly overlapped by the inclined reproducing track, have substantially no adverse effect on the measurement value thus determined.

In an arrangement of the above type, it has proven to be particularly advantageous if the nominal value corresponding to the nominal time interval can be generated, and for generating the nominal value, the arrangement comprises further time measuring means for determining a further measurement value corresponding to the time interval between a sensor pulse edge of a sensor pulse, which appears during scanning of an inclined reproducing track to record a video signal segment forming an information signal segment, and a line pulse edge of a line pulse of a video signal segment forming an information signal segment to be recorded in the inclined recording track, this further measurement value forming the nominal value. In this way, it is achieved that the nominal value is automatically adapted to the conditions prevailing in the arrangement, and that speed fluctuations of the at least one rotationally drivable magnetic head, during scanning of an inclined recording track for recording a video signal segment forming an information signal segment, such as a field signal, do not adversely affect the measurement value thus determined.

In all the above arrangements, the second means controls the tape drive device in dependence on the applied position information, for example, as regards the acceleration of the magnetic tape during a recording cycle for recording an information signal segment in an inclined recording track, enabling the acceleration time, or the occurrence of the acceleration starting instant, to be influenced. However, it has proven to be advantageous if, in dependence on the applied position information, the second means controls the tape drive device as regards the braking of the magnetic tape during a subsequent recording cycle for recording an information signal segment in an inclined recording track. In practice, this has proven to be very favorable for a particularly simple and effective control of the tape drive device.

In the above context, it has proven to be particularly advantageous if, in dependence on the applied position information, the second means control the tape drive device as regards the occurrence of the instant at which braking of the magnetic tape begins during a subsequent recording cycle for recording an information signal segment in an inclined recording track. This is advantageous for a very simple implementation, particularly for implementation by means of a microcomputer.

The above-mentioned as well as further aspects of the invention will become apparent from the exemplary embodiments described hereinafter and will be elucidated by means of these exemplary embodiments.

BRIEF DESCRIPTION OF THE DRAWINGS

The invention will now be described in more detail with reference to the drawings, which show two exemplary embodiments to which the invention is not limited, in which:

FIGS. 8A to 8G are schematic waveform diagrams of signals which appear in the video recorder shown in FIG. 7 and, with the aid of which, the first means generate the position information.

DESCRIPTION OF THE PREFERRED EMBODIMENTS

The construction and the operation of a first exemplary embodiment of the arrangement, in accordance with the invention formed by a video recorder, will be described in more detail with reference to FIGS. 1 to 6.

Figure 1:
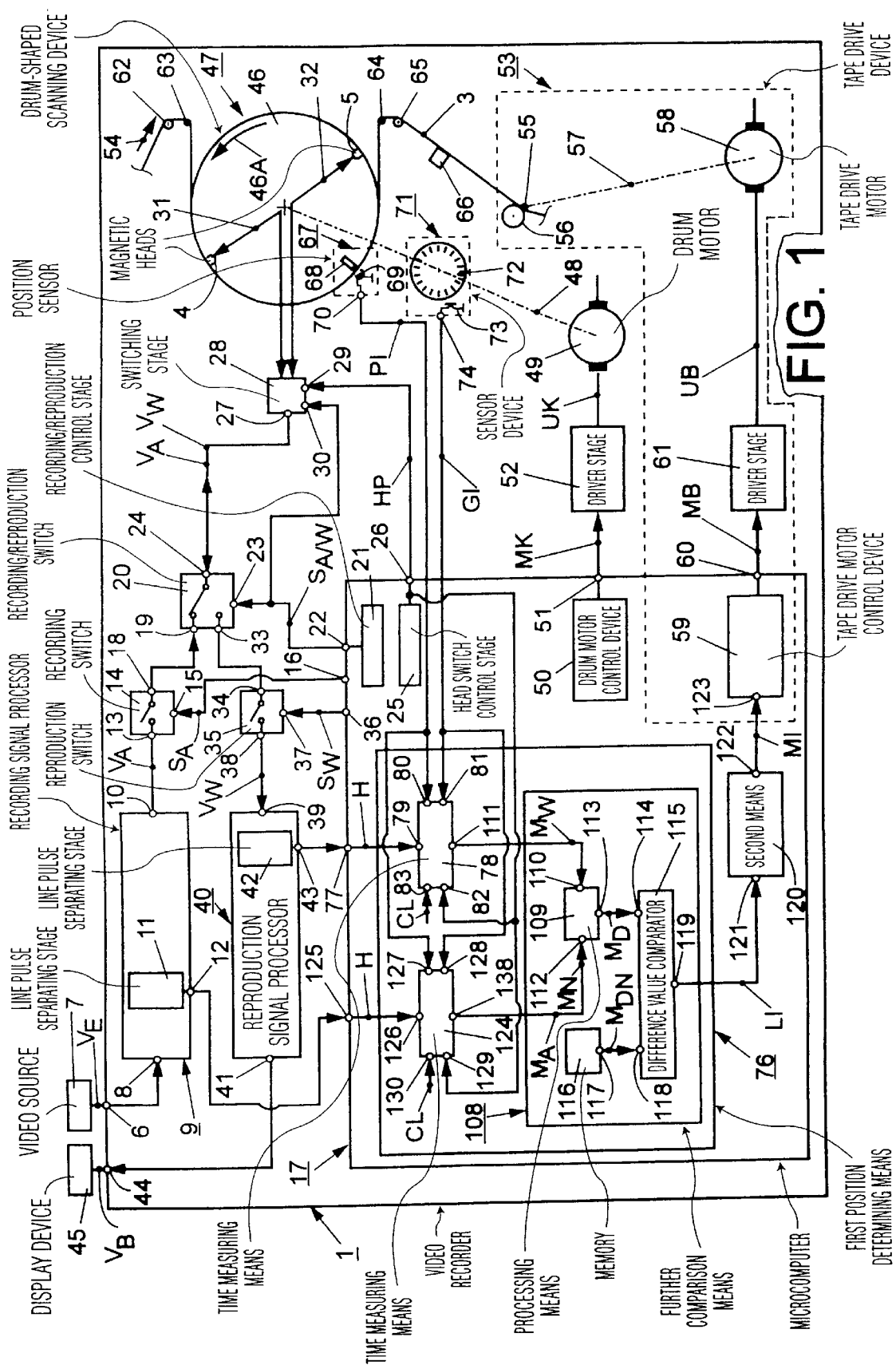
FIG. 1 shows, diagrammatically, a video recorder, forming a first exemplary embodiment of an arrangement in accordance with the invention, for recording video signals in a field-by-field fashion in inclined recording tracks on a magnetic tape which is drivable intermittently, i.e., with interruptions, by a tape drive device, and which comprises first means for generating position information using sensor pulses from a sensor device, and second means for controlling the tape drive device using the position information.

FIG. 1 shows, diagrammatically, the video recorder 1, which comprises two rotationally drivable magnetic heads 4 and 5 having different azimuth angles, for recording video signals in a field-by-field fashion in inclined recording tracks 2 on a magnetic tape 3. The inclined recording tracks 2 on the magnetic tape 3 are scanned by the two magnetic heads 4 and S. Of the inclined recording tracks 2 thus scanned, FIGS. 4 and 5 at least partly show the inclined recording tracks referenced $2_{n-10}$ to $2_{n-4}$, $2_{n-3}$, $2_{n-2}$, $2_{n-1}$, $2_n$ and $2_{n+1}$.

The video recorder 1 records a field signal corresponding to one field in an inclined recording track 2 on the magnetic tape 3 while the magnetic tape 3 is driven in each recording cycle of an intermittent recording mode which can be started in a manner not shown. A recording cycle, in which the magnetic tape 3 is accelerated, is driven continuously and is braked, then covers a time interval $T_G$, as indicated in FIG. 3E, which diagrammatically represents the variation of the tape drive speed $v_T$ during a recording cycle. After a recording cycle of the duration $T_G$ and after expiration of a given pause interval $T_H$, in which the magnetic tape 3 is stationary, a further recording cycle occurs, in which a field signal corresponding to a further field is recorded in an inclined recording track 2 on the magnetic tape 3 while the magnetic tape is being driven. The successive recording cycles recur periodically with a period $T_{SP}$, which is equal to the sum of the two above-mentioned time intervals $T_G$ and $T_H$. Such an intermittent, i.e., interrupted, recording of video signals, in which one field signal is recorded in each period $T_{SP}$, may cover an overall recording time of, for example, forty-eight (48) or even more hours on, for example, a magnetic tape, by means of which in a non-intermittent normal recording mode, i.e., in the case of recording without interruptions, an overall recording time of only three (3) hours is possible. It is to be noted that it is also possible to record two directly succeeding field signals in two adjacent inclined recording tracks within one recording cycle, i.e., within said period $T_{SP}$.

The video recorder 1 has an input terminal 6, to which video signals $V_E$ is applied from a video signal source 7 connected to the input terminal 6. The video signal source 7 connected to the input terminal 6 is preferably a video monitoring camera. However, it is also possible to connect an antenna to the input terminal 6 of the video recorder 1.

Moreover, it is likewise possible to connect a television signal receiver or a satellite receiver to the input terminal 6.

The input terminal 6 is connected to an input 8 of a recording signal processor 9. The video signals $V_E$, applied to the input terminal 6 of the video recorder 1, is supplied to the input 8 of the recording signal processor 9. The recording signal processor 9 processes, in known manner, the applied video signals $V_E$ to form video signals $V_A$ suitable for recording in the inclined recording tracks 2 on the magnetic tape 3. The video signals $V_A$ are available on an output 10 of the recording signal processor 9.

The recording signal processor 9 comprises a line pulse separating stage 11 for extracting the line pulses H from the video signals $V_A$ to be recorded. FIG. 3J diagrammatically shows a series of such line pulses H. The extracted line pulses H are available on an output 12 of the recording signal processor 9.

The output 10 of the recording signal processor 9 is connected to an input 13 of a recording switch 14. A control input 15 of the recording switch 14 is connected to an output 16 of a microcomputer 17. The microcomputer 17 generates, in a manner which is known and is therefore not shown in any detail, recording control pulses $S_A$ when the video recorder 1 is set to the recording mode in a manner not shown in any detail. The recording control pulses $S_A$, shown in FIG. 3B, are available on the microcomputer output 16, and are applied to the control input 15 of the recording switch 14. When a recording control pulse $S_A$ appears on the control input 15 of the recording switch 14, which is the case when the recording mode is activated, the input 13 of the recording switch 14 is connected to the output 18 of this switch. For the duration of the recording control pulse $S_A$, the video signals $V_A$ to be recorded, produced on the output 10 of the recording signal processor 9, are supplied from the input 13 of the recording switch 14 to the output 18 of the recording switch 14.

The output 18 of the recording switch 14 is connected to an input 19 of a recording/reproduction switch 20. The microcomputer 17 further forms a recording/reproduction control stage 21, which generates recording/reproduction pulses $S_{A/W}$ shown in FIG. 3D, when the recording mode is active, these pulses being available on an output 22 of the microcomputer 17. The output 22 is connected to a control input 23 of the recording/reproduction switch 20. When the recording mode is active, during which a recording/reproduction control pulse $S_{A/W}$ appears on the control input 23 of the recording/reproduction switch 20, the input 19 of the switch is connected to a terminal 24 of the recording/reproduction switch 20. When a recording control pulse $S_A$ appears on the control input 15 of the recording switch 14 and, in addition, a recording/reproduction control pulse $S_{A/W}$ appears on the control input 23 of the recording/reproduction switch 20, which is the case when the recording mode is active, the video signals $V_A$ to be recorded, which have been supplied to the output 10 of the recording signal processor 9, are available on the terminal 24 of the recording/reproduction switch 20.

The microcomputer 17 of the video recorder further forms a head-switch control stage 25 which generates head switch pulses HP and supplies these to a further output 26 of the microcomputer 17. FIG. 3A shows a series of such head switch pulses HP. The head switch pulses HP have a pulse duration TF of twenty (20) milliseconds in accordance with a PAL standard, and which corresponds to the duration of a field signal. The head switch pulses HP are spaced from one another by pulse spacings whose length $T_F$ corresponds to the pulse duration $T_F$.

The terminal 24 of the recording/reproduction switch 20 is connected to a terminal 27 of a switching stage 28, to which the video signals $V_A$ to be recorded, which appear on the terminal 24 of the recording/reproduction switch 20, are applied. The head switch control stage 25 is connected to a control input 29 of the switching stage 28 via the output 26 of the microcomputer 17. The control input 29 of the switching stage 28 receives the head switch pulses HP. The recording/reproduction control stage 21 is connected to a further control input 30 of the switching stage 28 via the output 22 of the microcomputer 17. The control input 30 of the switching stage 28 receives the recording/reproduction control pulses $S_{A/W}$.

When the recording/reproduction control stage 21 supplies a recording/reproduction control pulse $S_{A/W}$ to the control input 30 of the switching stage 28 while the recording mode is active, the video signals $V_A$ to be recorded, having been applied to the input 27 of the switching stage 28, are applied concurrently to the two rotationally drivable magnetic heads 4 and 5 via two electrical connections 31 and 32, which are shown only diagrammatically.

When the recording/reproduction control stage 21 does not supply a recording/reproduction control pulse $S_{A/W}$ to the control input 30 of the switching stage 28, which is the case if a reproduction mode has been activated in the video recorder 1 in a manner not shown, the switching stage 28 connects only one of the two inclined rotationally drivable magnetic heads 4 and 5 to the input 27 of the switching stage 28 via one of the two electrical connections 31 and 32. If, in the series of head switch pulses HP applied to the control input 29, a lower level occurs during a pulse spacing, i.e., if no head switch pulse HP is available, the one magnetic head 4 scans the magnetic tape during this pulse spacing, and the switching stage 28 connects the electrical connection 31, connected to the one magnetic head 4, to the input 27 of the switching stage 28 when the reproduction mode is active. When a high level occurs during a pulse duration $T_F$ in the series of head switch pulses HP applied to the control input 29 of the switching stage 28, i.e., when a head switch pulse HP appears, the other magnetic head 5 scans the magnetic tape 3 during this pulse duration $T_F$, and the switching stage 28 connects the electrical connection 32, connected to the other magnetic head 4, to the input 27 of the switching stage 28 when the reproduction mode is active.

When the reproduction mode is active and, consequently, there is no recording/reproduction control pulse $S_{A/W}$ on the control input 23, the recording/reproduction switch 20 connects the input 24 of the recording/reproduction switch 20 to an output 33 of the recording/reproduction switch 20, upon which the reproduced video signals $V_W$, supplied to the terminal 27 of the switching stage 28, are applied to the output 33 of the recording/reproduction switch 20 via the terminal 24.

The output 33 of the recording/reproduction switch 20 is connected to an input 34 of a reproduction switch 35. A further output 36 of the microcomputer 17 is connected to a control input 37 of the reproduction switch 35. In a known manner, which is therefore not shown, the microcomputer 17 generates reproduction control pulses $S_W$, these pulse being generated by the microcomputer 17 when the reproduction mode is active. The reproduction control pulses $S_W$ generated by the microcomputer 17 are supplied to its output 36 and, from the output 36, they are applied to the control input 37 of the reproduction switch 35. Such reproduction control pulses $S_W$ are shown in FIG. 3C. When a reproduction control pulse $S_W$ appears on the control input 37 of the reproduction switch 35, this switch 35 connects its input 34 to its output 38. During the occurrence of a reproduction control pulse $S_W$, the reproduced video signals $V_W$, read from the magnetic tape 3 by the magnetic heads 4 and 5, are applied to an input 39 of a reproduction signal processor 40 via the switching stage 28 and the recording/reproduction switch 20 as well as the reproduction switch 35. The reproduction signal processor 40 processes the reproduced video signals $V_W$ into video signals $V_B$ in known manner, these signals being available on an output 41 of the reproduction signal processor 40. The reproduction signal processor 40 includes a line pulse separating stage 42 for extracting line pulses H from the reproduced video signals $V_W$ applied to the line pulse separating stage 42. The extracted line pulses H are available on an output 43 of the reproduction signal processor 40.

The output 41 of the reproduction signal processor 40 is connected to an output terminal 44 of the video recorder 1, via which the video signals $V_B$, appearing on the output 41 of the reproduction signal processor 40, are applied to a display device 45 connected to the output terminal 44. The display device 45 can be, for example, a television receiver connected to the output terminal 44 of the video recorder 1.

To drive the two rotationally drivable magnetic heads 4 and 5, which, in the present case, are mounted in known manner on a rotationally drivable drum section 46 of a drum-shaped scanning device 47, a drum motor 49 is coupled to the drum section 46 via a drive transmission 48 shown, diagrammatically, as a dash-dot line, and rotates the drum section 46 and, hence, the magnetic heads 4 and 5, in the direction indicated by the arrow 46A. Moreover, a drum motor control device 50 is formed by the microcomputer 17 and produces motor control signals MK on the output 51 of the microcomputer 17, these signals being applied to a drum motor driver stage 52 connected to the output 51 of the microcomputer 17. Depending on the motor control signals MK, driver voltages UK, formed by the drum motor driver stage 52, are applied from the drum motor driver stage 52 to the drum motor 49, thus enabling the phase and the speed of the drum motor 49 and, as a consequence, of the two magnetic heads to be influenced. The magnetic heads 4 and 5 are driven with a given speed, so that they scan the inclined recording track with a head drive speed $v_H$, as is indicated, diagrammatically, by an arrow in FIGS. 4, 5 and 6.

Figure 4:
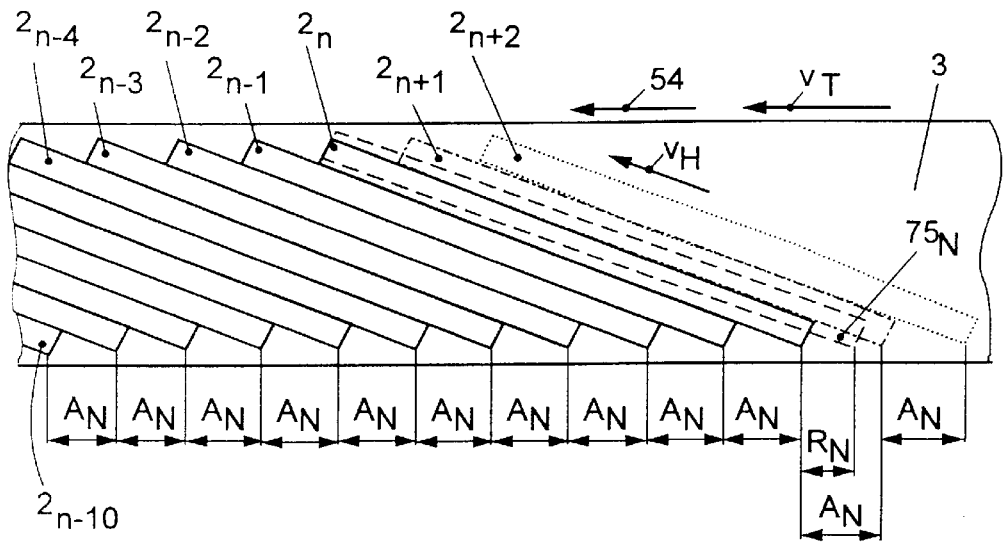
FIG. 4 shows a part of a magnetic tape on which inclined recording tracks have been recorded and which, after a temporarily last recording cycle, is scanned by two rotationally drivable magnetic heads of the video recorder shown in FIG. 1 along a nominal inclined reproducing track while the magnetic tape is stationary in a nominal relative position with respect to the two magnetic heads.
Figure 5:
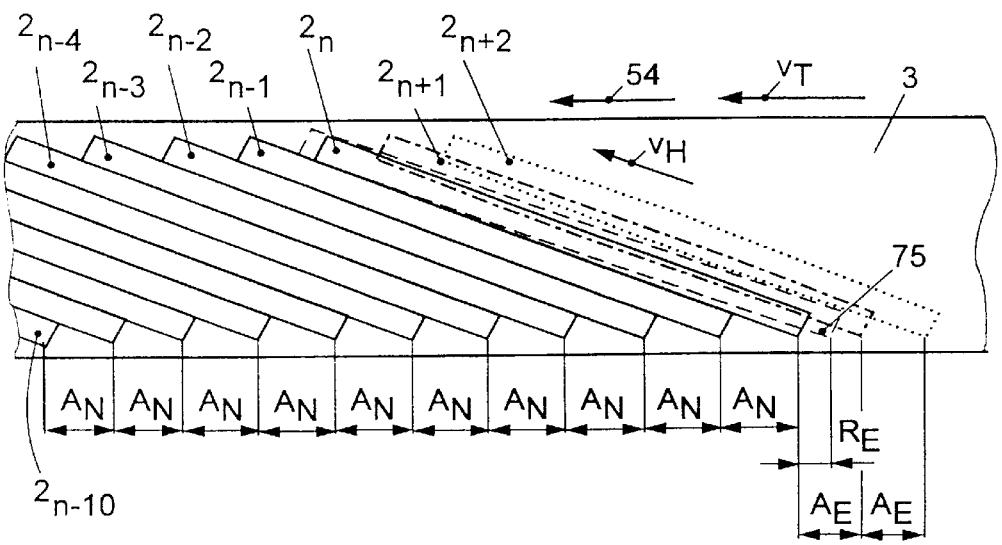
FIG. 5 shows a part of a magnetic tape on which inclined recording tracks have been recorded and which, after a temporarily last recording cycle, is scanned by the two rotationally drivable magnetic heads of the video recorder shown in FIG. 1 along an inclined reproducing track while the magnetic tape is stationary in an erroneous relative position with respect to the two magnetic heads.
Figure 6:
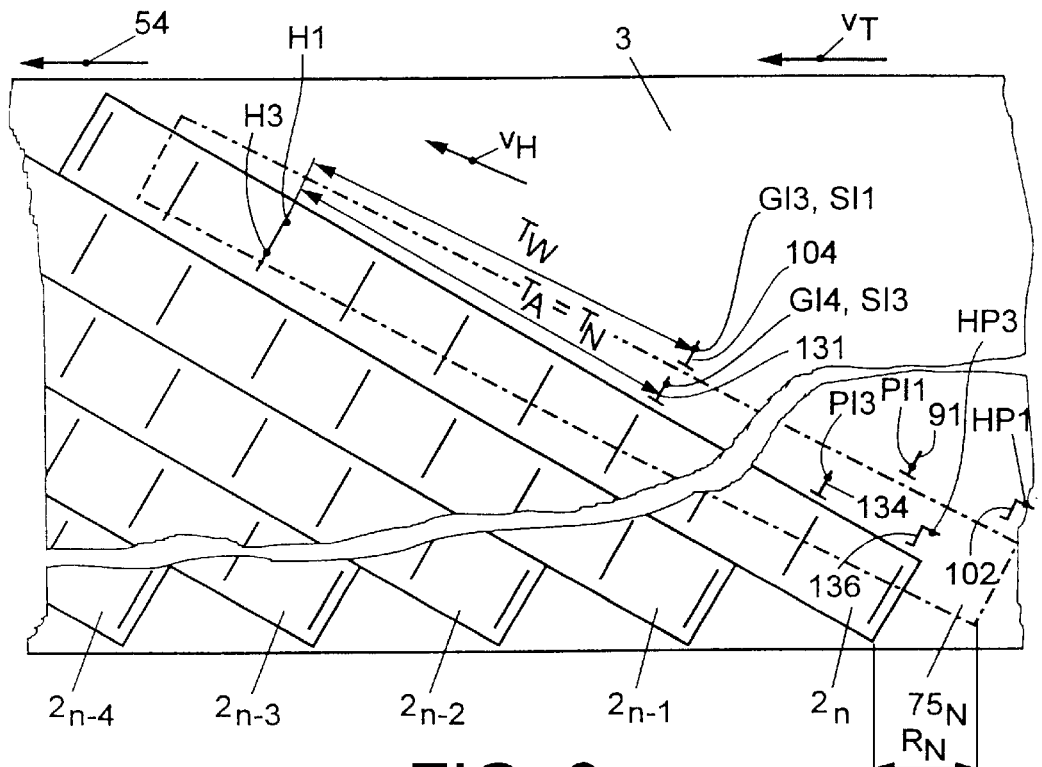
FIG. 6, to a larger scale than FIGS. 4 and 5, shows two areas adjacent the two tape edges of a part of a magnetic tape on which inclined recording tracks have been recorded, and which, after a temporarily last recording cycle, are scanned by the two rotationally drivable magnetic heads of the video recorder shown in FIG. 1 along a nominal inclined reproducing track while the magnetic tape is stationary in a nominal relative position with respect to the two magnetic heads.

The video recorder 1 further comprises a tape drive device 53 for intermittently driving the magnetic tape 3, i.e., with interruptions, in a longitudinal direction of the tape indicated by an arrow 54 in FIGS. 1, 4, 5 and 6. The tape drive device 53 drives a tape-drive capstan 55 against which the magnetic tape 3 is pressed by a tape pressure roller 56, which is movable in a manner not shown. The capstan 55 is driven by a tape drive motor 58 via a drive transmission 57 shown, diagrammatically, as a dash-dot line. The tape drive device 53 further comprises a tape-drive-motor control device 59 implemented by the microcomputer 17, which produces motor control signals MB on a further output 60, these signals being applied to a tape-drive-motor driver stage 61 connected to the output 60 of the microcomputer 17. Depending on the motor control signals MB, the driver voltages UB, formed by the tape-drive-motor driver stage 61, are applied from this stage 61 to the drive motor 58, so that the phase and the speed of the tape drive motor 58 and, as a consequence, the capstan 55 during acceleration, during continuous driving and during braking of the magnetic tape 3, can be influenced. The capstan 55 is drivable with a variable speed in such a manner that the magnetic tape 3 is driven in the longitudinal direction 54 of the tape with a tape drive speed $V_T$ in accordance with the speed diagram in FIG. 3E. In FIGS. 4, 5 and 6 the tape drive speed VT is shown, diagrammatically, by an arrow.

The magnetic tape 3 is wrapped around the drum-shaped scanning device 47 along a helical path over an angular range of slightly more than 180° by means of movable tape guides 62 and 63 as well as 64 and 65. An audio/sync magnetic head 66, which is stationary in operation, serves for recording and reproducing audio signals and sync signals.

The video recorder 1 further includes a position sensor 67, which comprises magnets 68, which rotate jointly with the two rotationally drivable magnetic heads 4 and 5, and a magnetic head 69, which is mounted stationarily in the video recorder. On an output 70, the position sensor 67 produces a position pulse PI for each revolution of the two magnetic heads 4 and 5, this pulse each time occurring briefly after the beginning of the scan of the magnetic tape 3 by the one rotationally drivable magnetic head 4. FIG. 3F shows a series of position pulses PI, in the present case shown, diagrammatically, as needle pulses. Such a position sensor can alternatively be of an optical type.

The video recorder 1 further includes a sensor device 71 comprising eighteen (18) optical marks 72, which rotate jointly with the two rotationally drivable magnetic heads 4 and 5, and a photo-electric pick-up 73, mounted stationarily in the video recorder 1. Accordingly, the sensor device 71 produces eighteen (18) sensor pulses GI in total on an output 74 for each revolution of the two magnetic heads 4 and 5. FIG. 3G shows a series of sensor pulses GI, likewise represented as needle pulses. Such a sensor device can alternatively be of a magnetic type.

To record a field signal corresponding to one field in an inclined recording track in the intermittent recording mode in the case of a recording cycle of the duration $T_G$, the magnetic tape 3 is driven by the tape drive device 53 in accordance with a given speed variation of the tape drive speed $v_T$, as is shown in FIG. 3E. In accordance with this speed variation of the tape drive speed $V_T$, the magnetic tape 3 is accelerated from standstill to a given constant recording tape speed $v_A$ during an acceleration time interval $T_U$, after which it is continuously driven with the constant recording tape speed $v_A$ during a driving time interval $T_T$ in excess of the pulse duration $T_F$ of a head switch pulse HP, and, subsequently, it is braked to standstill during a braking time interval $T_S$. In the present case, the constant recording tape speed $v_A$ in the intermittent recording mode corresponds to the long-play recording tape speed defined in the VHS standard, which corresponds to one-half the standard-play tape speed defined in the VHS standard, i.e., the customary normal tape speed. However, the recording tape speed may also have a different value. In order to drive the magnetic tape 3 with a constant recording tape speed VA for the duration $T_F$ of the actual recording while the recording mode is active, the magnetic tape 3 is already being driven with the constant recording tape speed $V_A$ before the beginning and after the end of the recording of a field signal for an overall driving time interval $T_T$.

In the intermittent recording mode, after termination of a recording cycle of the duration TGI the stationary magnetic tape 3 is scanned by the two rotationally drivable magnetic heads 4 and 5 along an inclined recording track 75 which partly overlaps the inclined recording track 2 last scanned. The field signal recorded in the relevant inclined recording track 2 which is partly overlapped by the inclined reproducing track 75, is then reproduced by one of the two magnetic heads 4 and 5, depending on the azimuth angle.

FIG. 4 shows the situation outlined above for the inclined recording track $2_n$ and a nominal inclined reproducing track $75_N$. The nominal inclined reproducing track $75_N$ extends at a smaller angle relative to the longitudinal direction 54 of the magnetic tape 3 than the inclined recording track $2_n$, since the nominal inclined reproducing track $75_N$ was scanned by both magnetic heads 4 and 5 while the magnetic tape 3 was stationary, whereas the inclined recording track 2, was assumed to be scanned by the magnetic head 4 while the magnetic tape 3 was driven with the constant recording tape speed $v_a$.

The inclined reproducing track 75, scanned by the two magnetic heads 4 and 5 after each recording in the inclined recording track 2 last scanned, occupies a relative position, in the longitudinal direction 54 of the tape, with respect to the last recording track 2 last scanned which is, each time, the same after braking of the magnetic tape 3, and depends on the conditions during braking of the magnetic tape 3 and during slackening of the magnetic tape 3.

As is shown in FIG. 4, the situation may occur that after braking, a nominal inclined reproducing track $75_N$ is scanned which occupies a nominal relative position with respect to the inclined recording track $2_n$ last scanned. However, it is likewise possible that the situation of FIG. 5 occurs, in which, after braking, an inclined recording track 75 is scanned which occupies an erroneous relative position with respect to the inclined recording track $2_n$ last scanned.

If each time the situation occurs that after braking, a nominal inclined reproducing track $75_N$ is scanned which, in the longitudinal direction 54 of the tape, occupies the nominal relative position shown in FIG. 4 with respect to the inclined recording track $2_n$ last scanned, in which the nominal inclined reproducing track $75_N$ has a nominal distance $R_N$, in the longitudinal direction 54 of the tape, from the inclined recording track 2, last scanned, a field signal is recorded—as shown in FIG. 4—in each subsequent recording cycle in an inclined recording track $2_{n+1}$, which has a nominal distance $A_N$ from the inclined recording track $2_n$ last scanned, which has the advantage that the magnetic reproduction is not disturbed during a subsequent reproduction of the field signals recorded in all the inclined recording tracks 2.

However, if, at least temporarily, the situation arises that after braking, an inclined reproducing track 75 is scanned which, in the longitudinal direction 54 of the tape, occupies an erroneous relative position, as shown in FIG. 5, with respect to the inclined recording track $2_n$ last scanned, in which position the inclined reproducing track 75 is situated at an erroneous distance $R_E$ from the inclined recording track $2_n$ in the longitudinal direction 54 of the tape, a field signal to be recorded in a subsequent recording cycle is recorded—as shown in FIG. 5—in an inclined recording track $2_{n+1}$ which has an erroneous distance $A_E$ from the inclined recording track 2, last scanned, as a result of which—if no additional measures are taken—the magnetic reproduction will be disturbed during a subsequent reproduction of the field signals recorded in all the inclined recording tracks 2.

Advantageously, measures have been taken in the video recorder 1 in order to preclude, or at least considerably restrict, the occurrence of an erroneous relative position, as described with reference to FIG. 5, between an inclined reproducing track and the inclined recording track last scanned, which is partly overlapped by the inclined reproducing track, as well as the resulting occurrence of the erroneous distance $A_E$ between two adjacent inclined recording tracks.

For this purpose, the video recorder 1 comprises first means 76 by which the relative position of the relevant inclined reproducing track 75, in the longitudinal direction 54 of the tape, with respect to the inclined recording track 2 scanned last and partly overlapped by the relevant inclined reproducing track 75, is determined, and which generates position information LI representative of the relative position thus determined. The first means 76 is advantageously implemented in a simple manner with the aid of the microcomputer 17. Line pulses H extracted from the reproduced video signals $V_W$ and appearing on the output of the reproduction signal processor 40, are applied to the first means 76 via a further input 77 of the microcomputer 17. The first means 76 includes time measuring means 78 for determining a measurement value $M_W$ which corresponds to a time interval $T_W$, indicated in FIG. 3H and in FIG. 6, between a rising edge of a given sensor pulse GI, which occurs when the inclined reproducing track 75 is scanned, and a rising edge of a given line pulse H, which appears after said sensor pulse G and has been reproduced from the inclined recording track 2 which is partly overlapped by the inclined reproducing track 75. Which of the reproduced line pulses H is selected as the given line pulse for determining a measurement value $M_W$ is, in principle, not relevant, it is merely necessary that a given line pulse H is chosen. It may be, for example, each antepenultimate line pulse H recorded in an inclined recording track 2, as is shown, by way of example, for the inclined recording track $2_n$ in FIG. 6.

The time measuring means 78 has an input 79 connected to the input 77 of the microcomputer 17. The line pulses H extracted from the reproduced video signals $V_W$ are applied to the time measuring means 78 via the input 79. A further input 80 of the time measuring means 78 is connected to the output 70 of the position sensor 67. The position pulses PI are applied to the time measuring means 78 via the input 80. A further input 81 of the time measuring means 78 is connected to the output 74 of the sensor device 71. The sensor pulses GI are applied to the time measuring means 78 via the input 81. A further input 82 of the time measuring means 78 is connected to the output 26 of the microcomputer 17. The head switch pulses HP generated by the head switch control stage 25 are applied to the time measuring means 78 via the input 82. Clock pulses CL, which are internally available in the microcomputer 17, are applied to a further input 83 of the time measuring means 78, a series of such clock pulses being shown, diagrammatically, in FIG. 3I. The clock pulses CL appear with an internal clock frequency of the microcomputer 17 and thus form a time standard.

In order to determine a measurement value $M_W$ as mentioned above, the time measuring means 78 performs a program which will be described hereinafter with reference to the flowchart 84 in FIG. 2, the signal waveforms in FIGS. 3A to 3J, and the part of the track pattern shown in FIG. 6.

When the video recorder 1 is in the intermittent recording mode, the reproduction mode is activated for the duration $T_F$ in each recording pause of the duration $T_H$, in which the magnetic tape 3 is stationary and the two rotationally drivable magnetic heads 4 and 5 scan an inclined reproducing track 75, which is necessary to reproduce the line pulses H recorded in the inclined recording track 2 which is partly overlapped by the inclined reproducing track 75, and the program for determining a measurement value $M_W$ with the aid of the time measuring means 78 is started one time in a block 85.

When a field signal has been recorded in an inclined recording track 2 by the one magnetic head 4, this field signal can be reproduced only by this magnetic head 4 because of the azimuth angle of the head 4, for which reason the program is started while the magnetic tape 3 is being scanned by the other magnetic head 5, in order to determine a measurement value $M_W$ during subsequent scanning of the magnetic tape 3 by the one magnetic head 4 while the reproduction mode is active. When, in a preceding recording cycle, a field signal has been recorded in an inclined recording track 2 by the other magnetic head 5, the program for determining a measurement value $M_W$ is started during subsequent scanning of the magnetic tape 3 by the one magnetic head 4.

In a block 86, which follows the block 85 in which the program has been started, it is checked whether a head switch pulse HP with a high level is present, which means that the other magnetic head 5 instantaneously scans the magnetic tape 3 along an inclined reproducing track 75. If the presence of a head switch pulse HP with a high level is detected, the program proceeds in a block 87. In the block 87, a counter C1 is loaded with the value of a constant A, which is A=3 in the present case. Subsequently, the program is continued in a block 88. Conversely, if, in the block 86, the presence of a pulse pause with a low level between two head switch pulses HP is detected, the program is continued in a block 89. In the block 89, the counter C1 is loaded with the value of a constant B, which is B=12 in the present case. Subsequently, the program is continued in the block 88 already mentioned. In the block 88, a counter C2 is loaded with the value "0". Subsequently, the program is continued in a block 90.

In the block 90, it is checked whether the rising edge of a position pulse PI has appeared. As long as this is not the case, the program remains in the block 90. However, when the rising edge of a position pulse PI is detected, the program proceeds in a block 92.

In the block 92, it is ascertained whether the rising edge of a sensor pulse GI has appeared. As long as this is not the case, the program remains in the block 92. However, when the rising edge of a sensor pulse GI is detected, the program proceeds in a block 94.

In the block 94, the value in the counter C2 is incremented by "1" and the new value is loaded into the counter C2. Subsequently, the program is continued in a block 95. In the block 95, it is checked whether the value in the counter C1 already corresponds to the value in the counter C2. If, in the block 95, it is found that the value in the counter C1 not yet corresponds to the value in the counter C2, the program proceeds to the block 92. However, if, in the block 95, the value in the counter C1 is found to correspond already to the value in the counter C2, the program proceeds to a block 96.

In the block 96, a counter C3 is loaded with the value "0" and start information SI is generated, which marks the start of a time measurement and which is shown, symbolically, as a needle pulse in FIG. 3H and in FIG. 6. Subsequently, the program is continued in a block 97. In the block 97, it is ascertained whether a clock pulse CL as shown in FIG. 3I has occurred. The program remains in the block 97 as long as no clock pulse CL has appeared. When a clock pulse CL is detected, the program proceeds to a block 98. In the block 98, the value in the counter C3 is incremented by the value "1" and the new value is loaded into the counter C3. Subsequently, the program is continued in a block 99. In the block 99, it is checked whether the rising edge of a given line pulse H, extracted from the reproduced video signals $V_W$, has occurred. The detection of the given line pulse H can be effected as disclosed in U.S. Pat. No. 5,067,030, herewith incorporated by reference. When the rising edge of the given line pulse H has not yet occurred after the operation in the block 96, the program proceeds to the block 97. However, if the rising edge of the given line pulse H has occurred after the operation in the block 96, the program is terminated in a block 100. After termination of the program in accordance with the flowchart 84, the count of the counter C3 forms the instantaneous measurement value $M_W$.

An example of determining such a measurement value $M_W$ is described hereinafter with reference to the signal waveform diagrams shown in FIGS. 3A to 3J and the track pattern shown in FIG. 6. It is assumed that in a preceding recording cycle, a field signal has been recorded in the inclined recording track $2_n$ by a magnetic head 4. In the present case, the program for determining the measurement value $M_W$ is started in the block 85 during a subsequent scan of the magnetic tape 3 by the other magnetic head 5, for example, upon the occurrence of the rising edge 101 of, for example, the head switch pulse HP1 in FIG. 3A. The head switch pulse HP1 has a falling edge 102. In the block 86, it is checked whether the head switch pulse HP1 appears with a high level. After the detection of the presence of the head switch pulse HP1 with a high level, the program proceeds to the block 87. In the block 87, the counter C1 is loaded with the value "A=3". After this, the program proceeds to the block 88. In the block 88, the counter C2 is loaded with the value "0". Subsequently, in the block 90, the occurrence of the rising edge of a position pulse PI is awaited, i.e., in the present example, the rising edge 91 of the position pulse PI1, see FIG. 3F. When this rising edge 91 of the position pulse PI1 appears, the program proceeds to the block 92. In the block 92, the occurrence of the rising edge of a sensor pulse GI is awaited, i.e., in the present example, the rising edge 93 of the sensor pulse GI1, see FIG. 3G. When the rising edge 93 of the sensor pulse GI1 occurs, the program proceeds to the block 94. In the block 94, the value "1" is added to the value in the counter C2, which is "0", and loaded into the counter C2, which then contains the value "1". In the next block 95, it is checked whether the counter C1 has the same count as the counter C2. Since the count of the counter C1 is "3" and the count in the counter C2 is "1", the program proceeds to the block 92. When the rising edge 102 of the next sensor pulse GI2 in the present example, see FIG. 3G, occurs, the program is continued in the block 94, in which the value "1" is added to the count of the counter C2. After this, it is again checked in the block 95 whether the count of the counter C2, which is "2" at this instant, is equal to that of the counter C1, which has the value "3". Since these counts are not equal, the program proceeds to the block 92. When the rising edge 103 of the next sensor pulse GI3 in the present example, see FIG. 3G and FIG. 6, occurs, the program proceeds to the block 94, in which the value "1" is added to the count of the counter C2. In the following check, in the block 95, it is found that the counts of the two counters C1 and C2, which are both "3", are equal, as a result of which, the program proceeds to the block 96.

In the present example the start information SI1, see FIG. 3H and FIG. 6, is generated in the block 96, which defines the beginning of the measurement of the measurement value $M_W$ to be determined. A time interval $T_{CA}$, indicated in FIG. 3G, which lies between the occurrence of the rising edge 91 of the position pulse PI and the generation of the start information SI1, is defined by the occurrence of the three rising sensor-pulse edges 93, 103 and 104 of the sensor pulses GI1, GI2 and GI3 after the appearance of the rising edge 91 of the position pulses PI1. Furthermore, the counter C3 is loaded with the value "0" in the block 96. The program subsequently proceeds to the block 97. In the block 97, the occurrence of a clock pulse CL is awaited. After the occurrence of a clock pulse CL, the value "1" is added to the count in the counter C3 in the next block 98. Then, the program proceeds to the block 99. In the block 99, it is checked whether the rising edge of a given reproduced line pulse H has appeared after the occurrence of the start information SI1, i.e., in the present example, the line pulse H1, see FIG. 3J and FIG. 6. As long as the occurrence of the given line pulse H1 has not been detected, the program proceeds cyclically from block 99 to the blocks 97 and 98, the count of the counter C3 being incremented by "1" after each appearance of a clock pulse CL in the block 98. If, subsequently, in the block 99, the rising edge of the given line pulse H1 is detected, the program is terminated in the block 100, upon which the count of the counter C3 corresponds to the measurement value $M_W$ thus determined, this measurement value representing the number of clock pulses CL detected between the start information SI1 and the rising edge of the given reproduced line pulse H1. Since the time interval between the occurrence of a clock pulse CL and the next clock pulse CL—as is shown in FIG. 3I—corresponds to a fixed time $T_{CL}$, the measurement value $M_W$ corresponds to the time interval $T_W$ in accordance with the equation:

$$T_W = M_W \times T_{CL}.$$

A further example of determining a measurement value $M_W$ will be described below, assuming that, in a preceding recording cycle, a field signal has been recorded in an inclined recording track 2 by the other magnetic head 5. In the present case, the program for determining the measurement value $M_W$, in accordance with the flowchart 84 in FIG. 2, is started in the block 85 during a subsequent scan of the magnetic tape 3 by the one magnetic head 4, for example, upon the occurrence of the rising edge 105 of, for example, the head switch pulse HP referenced HP2 in FIG. 3A. The head switch pulse HP2 has a rising edge 106. Subsequently, it is found, in the block 86, that a pulse spacing occurs between two head switch pulses HP, after which, in the block 89, the counter C1 is loaded with the value "B=12". After the subsequent loading of the counter C2 with the value "0", the occurrence of the rising edge of a position pulse PI is awaited in the block 90, i.e., in the present example, the rising edge 107 of the position pulse PI2, see FIG. 3F. After the occurrence of this rising edge 107 of the position pulse PI2, the appearance of the rising edge of a sensor pulse GI—see FIG. 3G—is awaited in the block 92, after which the blocks 92, 94 and 95 are cycled through twelve times until the result of the check in the block 95 is positive. Subsequently, start information SI, in the present example, the start information SI2 in FIG. 3H, is generated in the block 96, this information defining the start of the measurement for determining the measurement value $M_W$. A time interval $T_{CB}$ indicated in FIG. 3G, which lies between the occurrence of the rising edge 107 of the position pulse PI2 and the generation of the start information SI2, is defined by the occurrence of twelve rising edges of sensor pulses GI after the appearance of the rising edge 107 of the position pulses PI2. Furthermore, the counter C3 is loaded with the value "0" in the block 96, after which, by cycling through the blocks 97, 98 and 99, the clock pulses—see FIG. 3I—are counted, which is stopped upon the occurrence of the rising edge of a given reproduced line pulse H, in the present example, the line pulse H2, after which, the counter C3 contains the measurement value $M_W$ thus determined.

The instant of occurrence of the rising edge of the given line pulse H reproduced from the inclined recording track 2 last scanned, the line pulses H1 and H2, respectively, in the two examples described above, depends directly on the erroneous relative position of the relevant inclined reproducing track 75 with respect to relevant inclined recording track 2. The rising edge of the given reproduced line pulse H appears later and the time interval $T_W$, and, hence, the measurement value $M_W$ found, increases as the relevant inclined reproducing track 75 lies farther from the inclined recording track 2 last scanned, viewed in the longitudinal direction 54 of the tape. Thus, the measurement value $M_W$ determined, each time, is a direct measure of the relative position of the relevant inclined reproducing track 75 with respect to relevant inclined recording track 2 last scanned and, consequently, of the relative position of the magnetic tape 3 with respect to the two rotationally drivable magnetic heads 4 and 5.

The further comparison means 108 forms part of the first means 76 provided in the video recorder 1. This comparison means compares the measurement value $M_W$ with a nominal value $M_N$, which corresponds to a nominal time interval $T_N$ indicated in FIG. 6, and generates, in dependence upon the comparison result, the position information LI, which represents the relative position of the relevant inclined recording track 75, in the longitudinal direction 54 of the tape, with respect to the inclined recording track 2 which is partly overlapped by the inclined reproducing track 75. The nominal time interval $T_N$ and the corresponding nominal value $M_N$ will be discussed in more detail hereinafter.

The comparison means 108 includes processing means 109 having an input 110 connected to an output 111 of the time measuring means 78. The measurement value $M_W$, each time determined by the time measuring means 78, is applied from the output 111 of the time measuring means 78 to the input 110 of the processing means 109. A further input 112 of the processing means 109 is arranged to receive said nominal value $M_N$. The processing means 109 form a difference value $M_D$ in compliance with the equation $$M_D = M_N - M_W,$$

this difference being representative of the deviation of the instantaneous measurement value $M_W$ from the nominal value $M_N$. This difference value $M_D$ corresponds to a difference in geometrical distance, which is equal to the difference between the nominal distance $A_N$ in FIG. 4 and the erroneous distance $A_E$ in FIG. 5. The instantaneous difference value $M_D$ is available on an output 113 of the processing means 109.

The output 113 of the processing means 109 is connected to an input 114 of a difference value comparator 115, to which the instantaneous difference value $M_D$ is applied. The comparison means 108 further includes a memory 116 having an output 117 connected to a further input 118 of the difference value comparator 115. A nominal difference value $M_{DN}$ stored in the memory 116 is applied to the input 118 of the difference value comparator 115 via the output 117. The difference value comparator 115 compares the instantaneous difference value $M_D$ with the nominal difference value $M_{DN}$. The erroneous relative position of the inclined recording track 75, scanned by the two rotationally drivable magnetic heads 4 and 5, with respect to the inclined recording track 2 last scanned deviates increasingly from the actually desired nominal relative position of the inclined reproducing track 75 with respect to the inclined recording track 2 last scanned, as the deviation between the two values $M_D$ and $M_{DN}$ increases. Position information LI, formed by the comparison of the instantaneous difference value $M_D$ with the nominal difference value $M_{DN}$, is available on an output 119 of the difference value comparator 115. The position information LI thus generated corresponds to the deviation of said erroneous relative position from said nominal relative position and, thus, represents the instantaneous relative position of each inclined recording track 75 with respect to the inclined recording track 2 last scanned, which is partly overlapped by the inclined reproducing track 75.

The video recorder 1 also comprises second means 120 to which the position information LI, which is derived from the instant of occurrence of a line pulse H reproduced from the inclined recording track 2 last scanned, is applied, and which, in dependence upon this position information LI, controls the tape drive device 53 in a subsequent recording cycle for recording a field signal in an inclined recording track 2. A subsequent recording cycle is to be understood to mean not only the immediately following recording cycle. The second means 120 influences the tape drive device not only during the next recording cycle, but also during further recording cycles appearing after the next cycle, in that the average value of a plurality of position information values LI is formed.

The second means 120 has an input 121 connected to the output 119 of the difference value comparator 115, this input receiving the position information LI derived from the instant of occurrence of a line pulse H reproduced from the inclined recording track 2 last scanned. The second means 120 is connected to an input 123 of the tape-drive motor control device 59 via an output 122. The second means 120 supplies control information MI to the tape-drive motor control device 59 in dependence upon the instantaneous position information LI.

This control information MI ensures that the tape drive motor 58 is controlled so as to influence the occurrence of the starting instant of the braking action for braking the magnetic tape 3 to a standstill during a recording cycle for recording a field signal in an inclined recording track $2_{n+1}$ after a recording cycle for recording a field signal in an inclined recording track $2_n$, in such a manner that, during a recording cycle following said braking action, the inclined recording track $2_{n+2}$ then scanned, shown in dotted lines in FIG. 4, is situated, as accurately as possible, at a nominal distance $A_N$ from the inclined recording track $2_{n+1}$ previously scanned. In FIG. 3E, such a start-of-braking instant bears the reference $T_1$. As will be apparent, the second means 120 in the video recorder 1 is constructed in such a manner that, depending on the applied position information LI, it controls the tape drive device 53 in respect of the occurrence of the instant at which braking of the magnetic tape 2 starts during a recording cycle following the present recording cycle.

The tape drive motor control device 59 is controlled, as already stated, so as to change the occurrence of the start-of-braking instant $T_1$. In a nominal situation, in which the inclined reproducing track 75 has a nominal relative position with respect to the inclined recording track 2 last scanned, the start-of-braking instant $T_1$ should lie at a time interval $T_B$ after the occurrence of an edge of a head switch pulse HP, for example, the rising edge 106 of the head switch pulse HP2, as indicated in FIG. 3E. To change the occurrence of the start-of-braking instant $T_1$, the length of the time interval $T_B$ is varied in dependence on the position information LI generated by the first means 76.

In the normal case, the magnetic tape 3 is slackened substantially, each time, after the magnetic tape 3 has been braked to a complete standstill and, depending on the conditions, it is thus pulled back over different distances in a direction opposite to the longitudinal direction 54 of the tape, in which case—as is shown by way of example in FIG. 5—the inclined reproducing track 75 occupies an erroneous relative position, which depends on the conditions prevailing during slackening, with respect to the inclined recording track $2_n$ scanned immediately before, in which position, these two tracks are spaced at a distance $R_E$ from one another. If, during a subsequent recording cycle for recording a field signal in an inclined recording track $2_{n+1}$, as in the example shown in FIG. 5, the occurrence of the start-of-braking instant $T_1$ had not been changed, the inclined recording track $2_{n+2}$ to be scanned in a following recording cycle, shown in dotted lines in FIG. 5, would also occupy an erroneous relative position with respect to inclined recording track $2_{n+1}$, shown in dash-dot lines in FIG. 5, which would result in an erroneous distance $A_E$ between the two inclined recording track $2_{n+1}$ and $2_{n+2}$. However, in the present video recorder 1, the occurrence of the start-of-braking instant $T_1$ is changed in dependence on the respective position information LI generated by the first means 76, i.e., in the example shown in FIG. 5, the length of the time interval $T_B$ is extended in such a manner that, in a subsequent recording cycle for making a recording in the inclined recording track $2_{n+1}$, the magnetic tape 3 is braked at a later instant, so that said erroneous distance is increased during this subsequent recording cycle, as a result of which, an inclined recording track $2_{n+2}$ scanned in a subsequent recording cycle, at least more closely approximates to a nominal relative position with respect to the previously scanned inclined recording track $2_{n+1}$. When this process is repeated, the ideal track pattern shown in FIG. 4 will be obtained, at least approximately.

In the video recorder 1, the nominal value $M_N$ corresponding to the time interval $T_N$ is suitably not fixed but can be generated. To generate the nominal value $M_N$, further time measuring means 124 has been provided for determining a further measurement value $M_A$ when the recording mode is active, this measurement value corresponding to a time interval $T_A$, indicated in FIG. 3H and in FIG. 6, between a rising edge of a sensor pulse GI, which appears during scanning of an inclined recording track 2 in order to record a field signal, and a rising edge of a given line pulse H of a field signal to be recorded in the inclined recording track 2, and forming the nominal value $M_N$. Which of the line pulses H to be recorded is chosen as the given line pulse for determining a measurement value $M_A$, depends on which of the reproduced line pulses H has been selected as the given line pulse for determining a measurement value $M_W$. Thus, this can be each antepenultimate line pulse H to be recorded in an inclined recording track 2, as shown, by way of example, for the inclined recording track $2_n$ in FIG. 6.

To determine a measurement value $M_A$, the video recorder 1 has the output 12 of the recording signal processor 9 connected to an input 126 of the further time measuring means 124 via a further input 125 of the microcomputer 17. In this way, the line pulses, extracted from the video signals VA to be recorded, are applied to the input 126. A further input 127 of the further time measuring means 124 is connected to the output 70 of the position sensor 67. The position pulses PI are applied to the further time measuring means 124 via the input 127. A further input 128 of the further time measuring means 124 is connected to the output 74 of the sensor device 71. The sensor pulses GI are applied to the further time measuring means 124 via the input 128. A further input 129 of the further time measuring means 124 is connected to the output 26 of the microcomputer 17. The head switch pulses HP, generated by the head switch control stage 25, are applied to the further time measuring means 124 via the input 129. Clock pulses CL, shown, diagrammatically, in FIG. 3I, are applied to the further time measuring means 124 via a further input 130.

When the further time measuring means 124 determines a further measurement value $M_A$ during scanning of an inclined recording track $2_n$ by a magnetic head 4 for recording a field signal, that measurement value $M_A$ is determined which corresponds to the time interval $T_A$, which is indicated in FIG. 3H and FIG. 6, and which lies between the rising edge 131 of a sensor pulse GI4, see FIG. 3G and FIG. 6, which occurs during scanning of the inclined recording track $2_n$ in order to record a field signal, or the start information SI3 produced by this rising edge 131, see FIG. 3H and FIG. 6, and the rising edge of a given line pulse H3 to be recorded in the inclined recording track $2_n$, see FIG. 3J and FIG. 6. Here, the sensor pulse GI4 is the third one of three sensor pulses GI5, GI6 and GI4, which each have a rising edge 132, 133 and 131 and which occur after a position pulse PI3 having a rising edge 134, see FIG. 3F and FIG. 6, which, in its turn, appears after a head switch pulse ZHP3 having a rising edge 135 and a falling edge 136, see FIG. 3A and FIG. 6.

If, during scanning of an inclined recording track 2 by the other magnetic head 5 in order to record a field signal, the further time measuring means 124 detects a further measurement value $M_A$, the occurrence of twelve sensor pulses GI in total is awaited before the start information is generated, similarly to the detection of the corresponding measurement value $M_W$ after a position pulse PI. For example, after the position pulse PI4, see FIG. 3F, the occurrence of twelve sensor pulses GI is awaited before the start information SI4, see FIG. 3H, is generated, which starts a counting process for counting clock pulses CL, see FIG. 3I, which is stopped when the rising edge of the given line pulse H4, see FIG. 3J, after which the further time measuring means 124 contains the measurement value $M_A$ corresponding to the time interval $T_A$.

Figure 2:
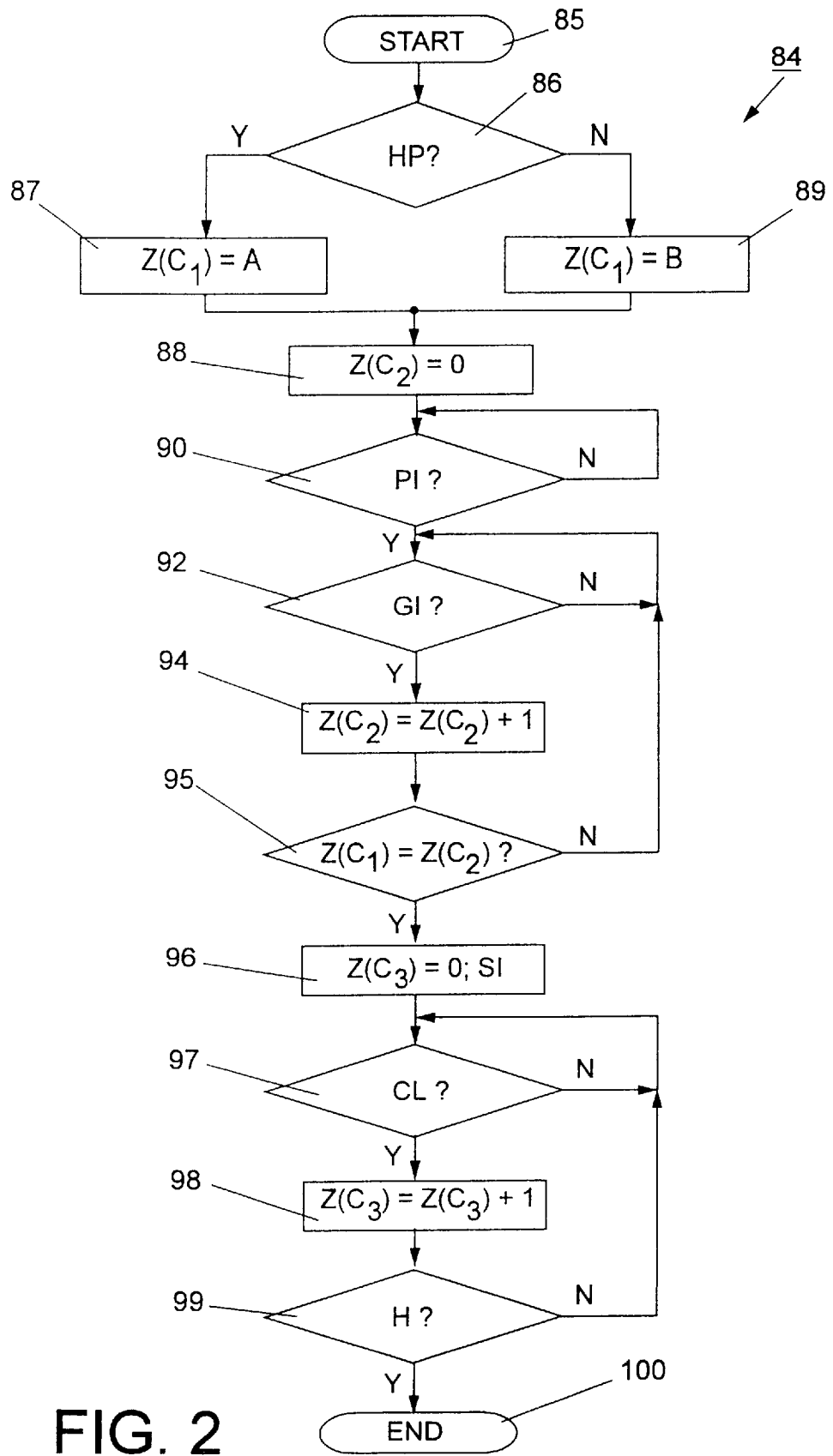
FIG. 2 is a flowchart of a program carried out in time measuring means and in further time measuring means of the video recorder shown in FIG. 1, these time measuring means both forming part of the first means for generating the position information.
Figure 3:
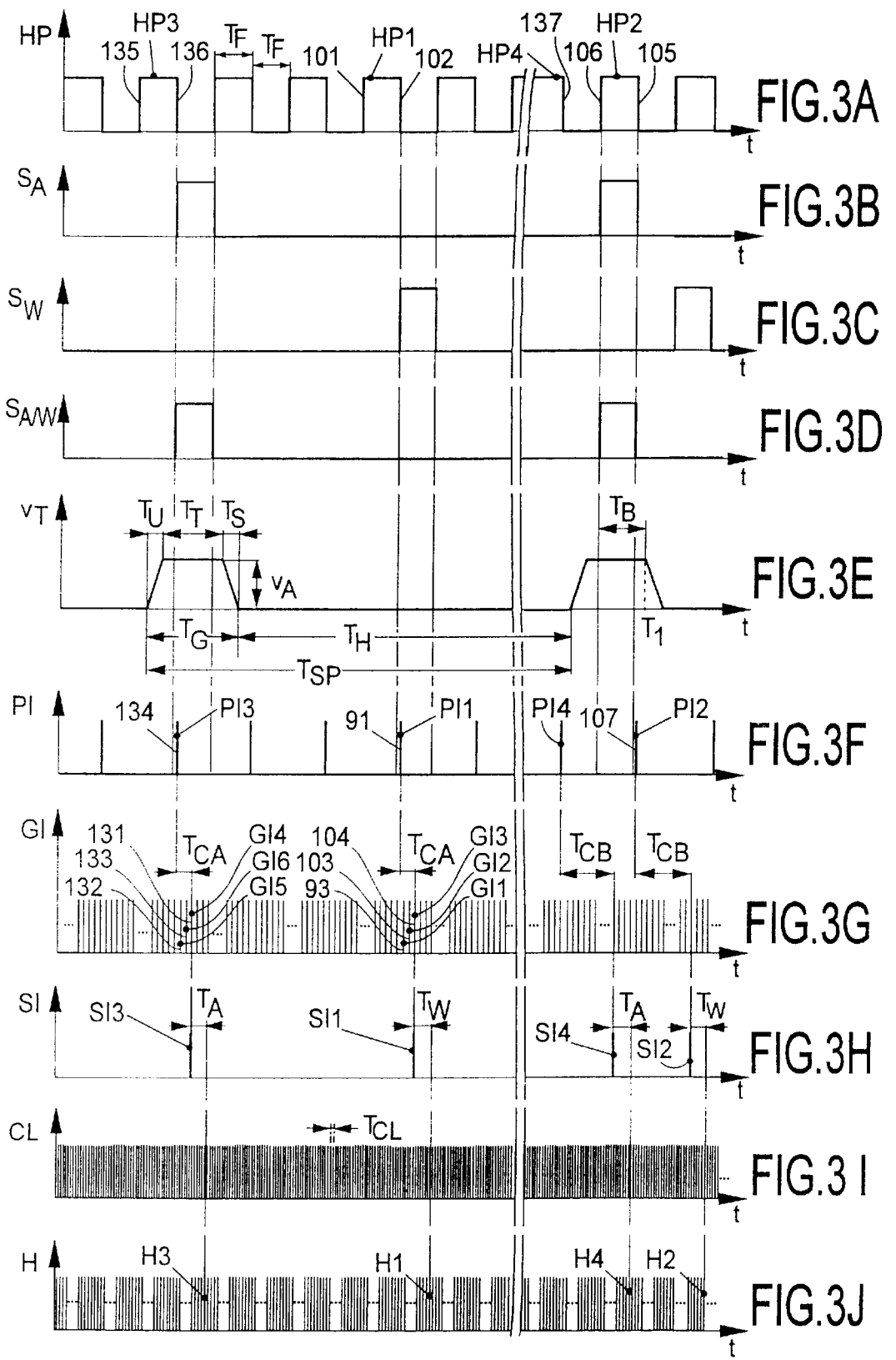
FIGS. 3A to 3J are schematic waveform diagrams of signals which appear in the video recorder shown in FIG. 1 and, with the aid of which, the first means generates the position information.

To determine a further measurement value $M_A$, the further time measuring means 124 suitably performs the same program as shown in the flowchart of FIG. 2 and as performed to determine the measurement value $M_W$ in the time measuring means 78. This program is started, for example, before an inclined recording track $2_n$, is scanned by the one magnetic head 4 upon the occurrence of the rising edge 135 of the head switch pulse HP3 in the block 85, and is performed with the aid of the position pulse PI3, the sensor pulses GI5, GI6 and GI4, as well as the given line pulse H3, as a result of which, the further time measuring means 124 then contains a measurement value $M_A$ which forms the nominal value $M_N$. However, this program can also be started in the block 85 before an inclined recording track 2 is scanned by the other magnetic head 5, upon the occurrence of the falling edge 137 of a head switch pulse HP4 which directly precedes the rising edge 106 of the head switch pulse HP2, and is performed with the aid of the position pulse PI4, twelve sensor pulses GI appearing after the position pulse PI4, as well as the given line pulse H4, as a result of which, the further time measuring means 124 then contains a measurement value $M_A$ which forms the nominal value $M_N$.

The further time measuring means 124 has an output 138 connected to the input 112 of the processing means 109. The further measurement value $M_A$, determined by the further time measuring means 124 and available on the output 138, is applied to the processing means 109 via the input 112 as the nominal value $M_N$.

By generating the nominal value $M_N=M_A$ while the recording mode is active during a recording cycle, and by subsequently determining the measurement value $M_W$ while subsequently the reproduction mode is active during a reproduction cycle, speed fluctuations of the two rotationally drivable magnetic heads 4 and 5, which can occur during these two cycles, have substantially no adverse effect on the position information LI to be generated, because errors as a result of speed fluctuations are substantially equal, since the generation of the nominal value $M_N=M_A$ and the determination of the measurement value $M_W$ take place comparatively closely after one another, and are consequently eliminated as a result of the difference formation while the two values $M_N=M_A$ and $M_W$ are processed in the processing means 109. Consequently, the position information LI generated by the first means 76 is substantially independent of speed fluctuations of the rotationally drivable magnetic heads 4 and 5.

FIG. 6 shows a part of a track pattern on the magnetic tape 3 to an enlarged scale in comparison with FIGS. 4 and 5. On the magnetic tape 3, video signals have been recorded in the inclined recording tracks 2, and it is assumed that field signals have been recorded in the tracks $2_{n-4}$, $2_{n-2}$ and $2_n$ by the one magnetic head 4, and in the tracks $2_{n-3}$ and $2_{n-1}$ by the other magnetic head 5. When the magnetic tape 3 is stationary, it is scanned by the two rotationally drivable magnetic heads 4 and 5 along the nominal inclined reproducing track $75_N$. Relative scanning positions of the one magnetic head 4, occupied by this magnetic head 4 during the occurrence of given pulse edges or pulses, are shown in relation to the inclined recording track $2_n$ and the inclined reproducing track $75_N$. These relative scanning positions are represented as pulse edges or pulses.

One of the relative scanning positions which are shown is that of the magnetic head 4 with respect to the nominal inclined reproducing track $75_N$ during the occurrence of the falling edge 102 of the head switch pulse HP1, which appears at the beginning of the scan of the nominal inclined reproducing track 75, by the magnetic head 4. Moreover, a relative scanning position of the magnetic head 4 is shown with respect to the nominal inclined reproducing track $75_N$ during the occurrence of the rising edge 91 of the position pulse PI1, which is generated in the stationary magnetic head 69 when the nominal inclined reproducing track $75_N$ is scanned by the magnetic head 4 while the magnet 68 of the position sensor 67 moves past said stationary magnetic head, this position pulse being applied to the time measuring means 78 with which the occurrence of the rising edges 93, 103 and 104 of the sensor pulses GI1, GI2 and GI3 is detected, and with which the start information SI1 is generated during the occurrence of the rising edge 104 of the sensor pulse GI3, this start information occurring in a relative scanning position of the magnetic head 4, represented, symbolically, by a needle pulse, with respect to the nominal inclined reproducing track $75_N$, and starting a counting process for counting clock pulses CL in the time measuring means 78 in order to determine a measurement value $M_W$. FIG. 6 further shows a relative scanning position of the magnetic head 4 with respect to the nominal inclined reproducing track $75_N$ during the occurrence of the given line pulse H1, this occurrence being detected by the time measuring means 78, in order to stop the process of counting clock pulses CL for the purpose of determining the measurement value $M_W$.

FIG. 6 also shows a relative scanning position of the magnetic head 4 with respect to the inclined recording track $2_n$ occupied by the magnetic head 4 during the occurrence of the falling edge 136 of the head switch pulse HP3. Moreover, a relative scanning position of the magnetic head 4 with respect to the inclined recording track $2_n$ is shown during the occurrence of the rising edge 134 of the position pulse PI3, which is generated during scanning of the inclined recording track 2, and whose rising edge 134 is detected similarly to the detection of the occurrence of the rising edge 91 of the position pulse PI1 during scanning of the nominal inclined reproducing track $75_N$. Furthermore, FIG. 6 shows a relative scanning position of the magnetic head 4 with respect to the inclined recording track $2_n$ during the occurrence of start information SI2 represented, symbolically, as a needle pulse, this start information being generated likewise after the occurrence of the rising edges 132, 133 and 131 of the three sensor pulses GI5, GI6 and GI4, upon detection of the occurrence of the rising edge 131 of the sensor pulse GI4 and which starts the counting process for counting clock pulses CL in order to determine a further measurement value $M_A$. Finally, FIG. 6 shows a relative scanning position of the magnetic head 4 with respect to the inclined recording track $2_n$ during the occurrence of the given line pulse H3, whose rising edge is detected by the further time measuring means 124, in order to stop the process of counting clock pulses CL for the purpose of determining the further measurement value $M_A$.

As is apparent from the above description, this results in a video recorder 1 for recording video signals in a field-by-field fashion, in which a track spacing between successive inclined recording tracks 2 is obtained which, on an average, corresponds to a predetermined nominal spacing $A_N$. Thus, it is achieved, in an advantageous manner, that during a subsequent reproduction of the field signals recorded in all the successive inclined recording tracks 2, no disturbances occur as a result of excessive deviations of the distances between successive inclined recording tracks 2 in the longitudinal direction 54 of the tape from a nominal value, i.e., the nominal spacing $A_N$.

Figure 7:
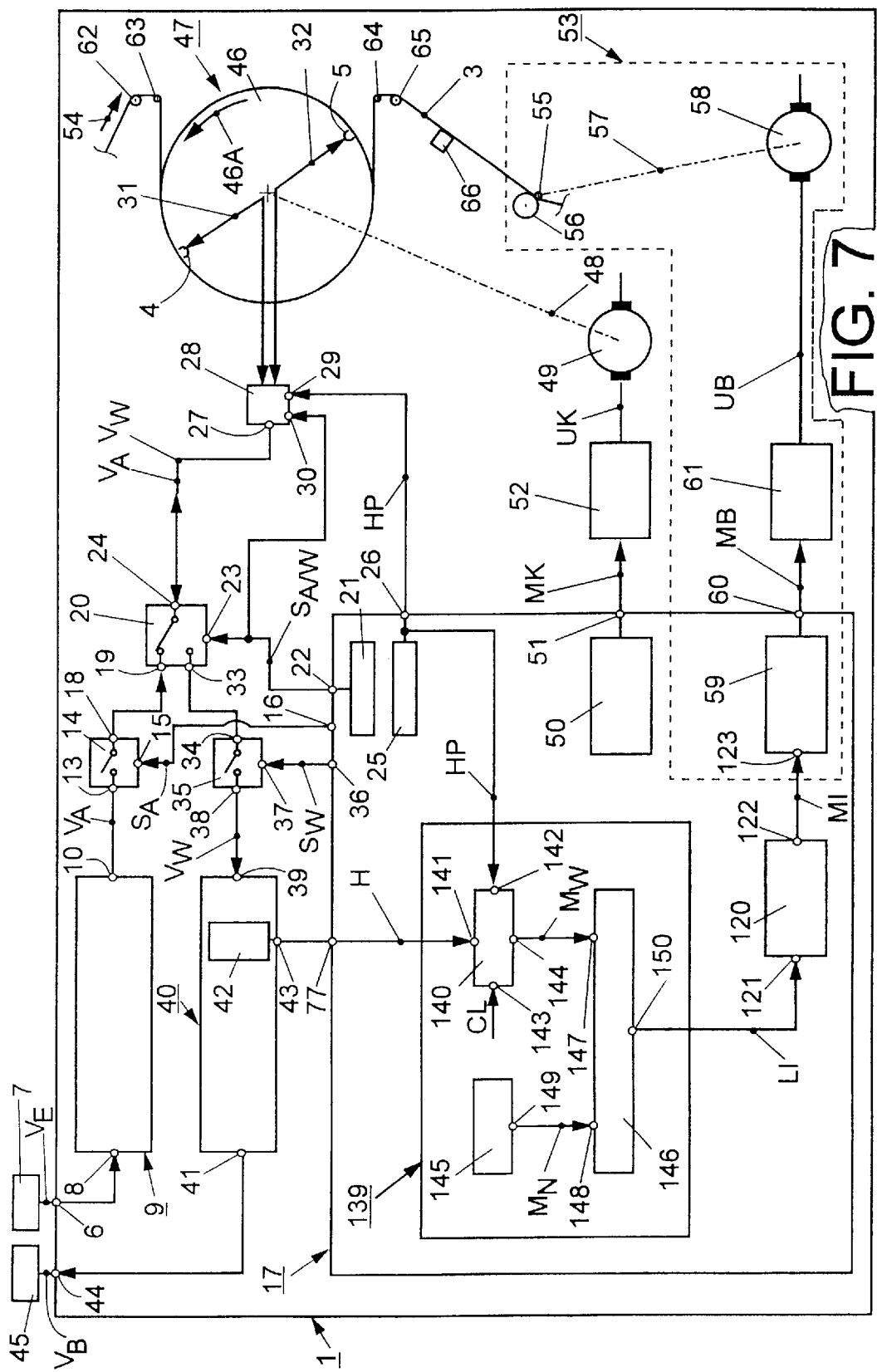
FIG. 7 shows, diagrammatically, a video recorder, forming a second exemplary embodiment of an arrangement in accordance with the invention, for recording video signals in a field-by-field fashion in inclined recording tracks on a magnetic tape which is drivable intermittently, i.e., with interruptions, by a tape drive device, and which comprises first means for generating position information using head switch pulses, and second means for controlling the tape drive device using the position information.

FIG. 7 also shows, diagrammatically, a second exemplary embodiment of the arrangement in accordance with the invention formed by a video recorder 1. The video recorder 1 shown in FIG. 7 differs from the video recorder 1 shown in FIG. 1 in respect of the implementation of the first means for generating position information. The construction and operation of the video recorder 1 in accordance with FIG. 7 will be described hereinafter with reference to FIGS. 7 to 9, but only the differences with the video recorder shown in FIG. 1 will be discussed.

Figure 9:
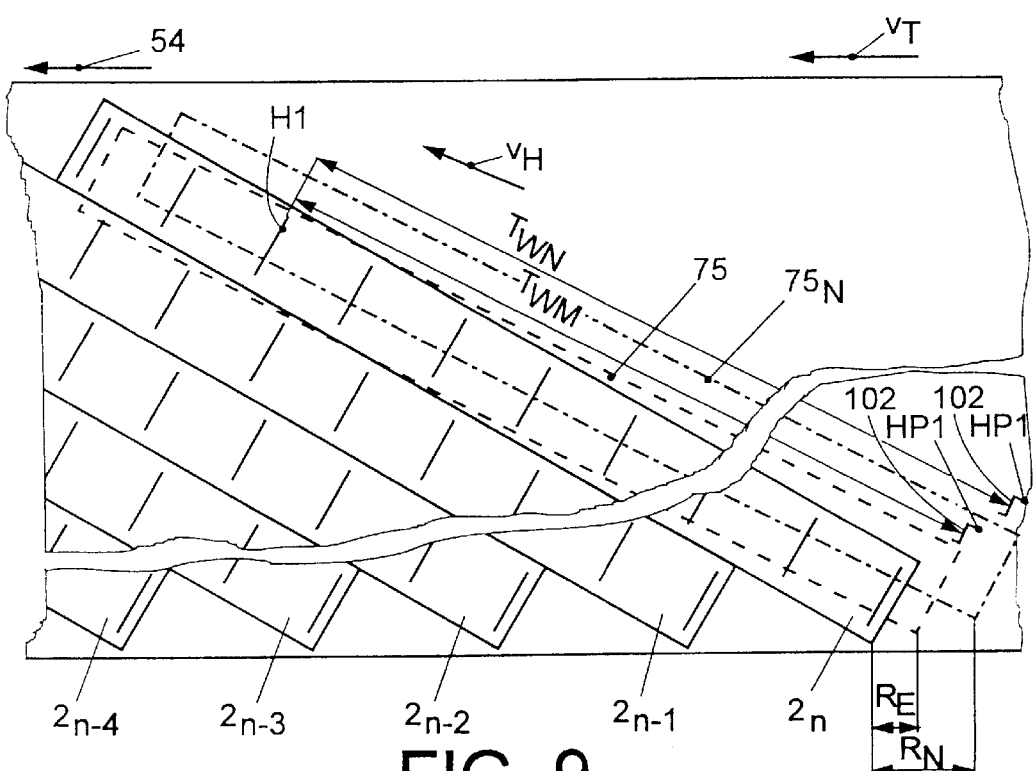
FIG. 9, in the same way as FIG. 6, shows two areas adjacent the two tape edges of a part of a magnetic tape on which inclined recording tracks have been recorded, and which, after a temporarily last recording cycle, are scanned by two rotationally drivable magnetic heads of the video recorder shown in FIG. 7 while the magnetic tape is stationary, namely, along a nominal inclined reproducing track while the magnetic tape is stationary in a nominal relative position with respect to the magnetic head, or along an inclined reproducing track while the magnetic tape is stationary in an erroneous relative position with respect to the magnetic head.

The video recorder 1 shown in FIG. 7 has first means 139 which comprises time measuring means 140 for determining a measurement value $M_W$ corresponding to the time interval $T_{WM}$, see FIG. 8G and FIG. 9, between a pulse edge of a head switch pulse HP, which occurs at the beginning of a scan of an inclined reproducing track 75, and the rising edge of a given reproduced line pulse H, i.e., in the example illustrated in FIG. 9, the time interval $T_{WM}$ between the edge 102 of the head switch pulse HP1, see FIG. 8A, and the rising edge of the line pulse H1, see FIG. 8G and FIG. 9, reproduced from the inclined recording track $2_n$ which is partly overlapped by the inclined recording track 75. This time interval $T_{WM}$ depends on the instant at which a given reproduced line pulse H occurs and, hence, on the erroneous relative position of the respective inclined recording track 75 relative to inclined recording track 2 last scanned and partly overlapped by this inclined reproducing track and, as a consequence, this time interval $T_{WM}$ and the measurement value $M_W$ to be determined and corresponding to this time interval $T_{WM}$ are representative of said erroneous relative position.

The time measuring means 140 of the first means 139 has an input 141 connected to the output 43 of the reproduction signal processor 40 via an input 77 of the microcomputer 17. Line pulses H, see FIG. 8G, extracted from the reproduced video signals $V_W$ by the line pulse separating stage 42 of the reproduction signal processor 40, are applied to the output 43 and then to the input 141 of the time measuring means 140. A further input 142 of the time measuring means 140 is connected to the output 26 of the microcomputer 17. The head switch pulses HP, see FIG. 8A, generated by the head switch control stage 25, are applied to the time measuring means 140 via the further input 142. Clock pulses CL, shown, diagrammatically, in FIG. 8F, are applied to a further input 143 of the time measuring means 140.

FIG. 9, in the same way as FIG. 6, shows a part of a track pattern on the magnetic tape 3 to an enlarged scale. On the magnetic tape 3, video signals have been recorded in the inclined recording tracks 2, i.e., in the tracks $2_{n-4}$, $2_{n-2}$ and $2_n$, by the one magnetic head 4, and in the tracks $2_{n-3}$ and $2_{n-1}$ by the other magnetic head 5. When the magnetic tape 3 is stationary, it is scanned by the two rotationally drivable magnetic heads 4 and 5 along an inclined reproducing track 75. Depending on the relative position between the stationary magnetic tape 3 and the two rotationally drivable magnetic heads 4 and 5, either an inclined reproducing track 75 shown in dashed lines in FIG. 9, is scanned, which has an erroneous distance $R_E$ from the inclined recording track $2_n$ last scanned, or a nominal inclined recording track $75_N$ shown in dash-dot lines in FIG. 9, is scanned, which is situated at a nominal distance $R_N$ from the inclined recording track $2_n$ last scanned. In the case of the video recorder 1 shown in FIG. 7, the objective is again to ensure that after each recording cycle, by suitably braking the magnetic tape 3, the nominal inclined recording track $75_N$ is scanned by both magnetic heads 4 and 5 after braking when the magnetic tape 3 is stationary.

FIG. 9, similarly to FIG. 6, shows a relative scanning position of the one magnetic head 4 with respect to the inclined reproducing track 75 and the nominal inclined reproducing track $75_N$, while the falling edge 102 of the head switch pulse HP1 appears on the input 142 of the time measuring means 140. From this instant, see FIG. 9 as well as FIG. 8A, the time measuring means 140 counts the clock pulses CL, see FIG. 8F, appearing on its input 143, and the number thus counted is stored. This counting process is stopped upon the occurrence of the rising edge of a given reproduced line pulse H, for example, the line pulse H1, see FIG. 9 as well as FIG. 8G. In the video recorder 1 shown in FIG. 7, the detection of a given line pulse H can be also effected as disclosed in U.S. Pat. No. 5,067,030, herewith incorporated by reference. When the rising edge of the given line pulse H has occurred, counting of the clock pulses CL is stopped and the number of clock pulses thus counted is available on an output 144 as a measurement value $M_W$, which corresponds to the actual time interval $T_{WM}$, see FIG. 9 and FIG. 8G.

The first means 139 includes a memory 145 in which a nominal value $M_N$ is stored, which corresponds to a nominal time interval $T_{WN}$, also indicated in FIG. 9, which can be determined by the time measuring means 140 if the magnetic tape 3 is stationary in a nominal relative position with respect to the two rotationally drivable magnetic heads 4 and 5 and the two magnetic heads 4 and 5 scan the nominal inclined recording track 75N.

The first means 139 further comprises comparison means 146 for comparing the instantaneous measurement value $M_W$ with the nominal value $M_N$, which corresponds to the nominal time interval $T_N$, and for generating, in dependence upon the comparison result, the position information LI, which represents the relative position of the relevant inclined recording track 75 with respect to the inclined recording track 2 which is partly overlapped by the inclined reproducing track 75. The comparison means 146 has an input 147 connected to the output 144 of the time measuring means 140, via which input the instantaneous measurement value $M_W$ is applied to the comparison means 146. The comparison means 146 has a further input 148 connected to an output 149 of the memory 145, via which further input, the nominal value $M_N$ is applied to the comparison means 146.

The actual time interval $T_{WM}$, shown in FIG. 9, which is obtained when the inclined reproducing track 75 is scanned by one of the magnetic heads 4 and 5, is smaller than the nominal time interval $T_{WN}$, which prevails when the nominal inclined reproducing track $75_N$ is scanned by one of the two magnetic heads 4 and 5. This means that after prior braking to a standstill of the magnetic tape 3, the tape has been withdrawn over a distance $R_N-R_E$ in a direction opposite to the longitudinal direction 54 of the tape with respect to the nominal relative position with respect to the two magnetic heads 4 and 5, this position being desired for a correct reproduction from all the inclined recording tracks 2. In this situation, the measurement value $M_W$ thus determined is smaller than the nominal value $M_N$, which is determined using the comparison means 146. The comparison means 146 has an input 150, to which the input 121 of the second means 120 is connected and via which the position information LI, generated by said comparison, is applied to the second means 120.

In the case that the measurement value $M_W$ thus determined is greater than the nominal value $M_N$, this means that the magnetic tape 3 has been moved too far over a certain distance in the longitudinal direction 54 of the tape with respect to said nominal relative position in relation to the two magnetic heads 4 and 5. Accordingly, the comparison means 146 then supplies different position information LI to the second means 120.

As stated, position information LI is applied to the input 121 of the second means 120. Depending on the applied position information, the second means 120 controls the tape drive device 53 as regards the braking of the magnetic tape 3 during a subsequent recording cycle, to record a field signal in an inclined recording track 2. In dependence upon the position information LI, the second means 120 supplies control information MI to the tape drive motor control device 59. In the present case, this control information MI ensures that the braking time of a braking operation during a subsequent recording cycle is influenced, so that, in the case that the detected measurement value $M_W$ is smaller than the nominal value $M_N$, a comparatively long braking time $T_{BD1}$ for the tape drive motor is generated, and, in the case that the detected measurement value $M_W$ is greater than the nominal value $M_N$, a comparatively short braking time $T_{BD2}$ for the tape drive motor 58 is obtained, as is shown, diagrammatically, for the two speed curves of the tape drive speed $v_T$ in FIG. 8.

The video recorder 1 shown in FIG. 7 has the advantage that the first means 139 is of a very simple construction. Moreover, the video recorder 1 shown in FIG. 7 has the advantage that an average track spacing corresponding to a given nominal value is obtained between successive inclined recording tracks 2. Thus, this video recorder 1 also has the advantage that during subsequent reproduction of the field signals recorded in all the consecutive inclined recording tracks 2, no disturbances occur as a result of excessive deviations of the distances between successive inclined recording tracks 2 from a nominal value in the longitudinal direction 54 of the tape.

The invention is not limited to the two arrangements in accordance with the two exemplary embodiments described hereinbefore. These two arrangements relate to video recorders for the field-by-field recording of analog video signals in inclined recording tracks in an intermittent recording mode. The invention can also be applied to video recorders in which analog video signals are not recorded in a field-by-field fashion but in a picture-by-picture fashion or otherwise in inclined recording tracks in an intermittent recording mode. The invention can also be used in video recorders in which digital video signals are recorded in inclined recording tracks in an intermittent recording mode, in which case, the digital video signals corresponding to a picture or field may be recorded in a plurality of inclined recording tracks. However, the invention can also be used in other arrangements, for example, in arrangements for recording digital data signals in inclined recording tracks in an intermittent recording mode, for example, for contiguously storing digital data signals which merely succeed one another, after which they are available in direct succession. In such an arrangement for recording digital data signals in an intermittent recording mode, a given number of data blocks, which each represent an information signal segment, are recorded in each inclined recording track. An arrangement in accordance with the invention need not be a separate apparatus, such as a video recorder, but may, alternatively, form part of a system comprising a plurality of units or arrangements. For example, an arrangement in accordance with the invention constructed as a video recorder may form part of a video monitoring system.

In the two exemplary embodiments of arrangements in accordance with the invention described hereinbefore, the tape drive device is controlled in respect of the braking of the magnetic tape, the tape drive device in the one arrangement being controlled as regards the occurrence of the instant at which braking of the magnetic tape begins, and the tape drive device in the other arrangement being controlled as regards the braking time during which the magnetic tape is braked. It is to be noted that it is, of course, also possible to control a tape drive device as regards the acceleration of the magnetic tape, in which case, it is likewise possible to influence either the occurrence of the instant at which the magnetic tape is accelerated or to influence the time during which the magnetic tape is accelerated. Another possibility is to control the tape drive device both as regards the acceleration of the magnetic tape and the braking of the magnetic tape.

What is claimed is:

1. An arrangement for recording information signals in recording tracks on a magnetic tape, said arrangement comprising:

at least one rotationally drivable magnetic head for scanning inclined recording tracks on the magnetic tape; and a tape drive device for intermittently driving the magnetic tape in a longitudinal direction of the tape, in which, for recording an information signal segment by the magnetic head in an inclined recording track during a recording cycle, the magnetic tape is accelerated from standstill to a given recording tape speed, is subsequently driven at the recording tape speed for at least the duration of the recording of the information signal segment, and is subsequently braked to standstill, and in which, after completion of a recording cycle when the magnetic tape is stopped, the stationary magnetic tape is scanned by the magnetic head along an inclined reproducing track which partly overlaps the inclined recording track last scanned, and the information signal segment recorded in the inclined recording track last scanned is then reproduced, wherein said arrangement further comprises:

first means for determining, when said magnetic tape is stopped and during the scanning of said inclined reproduction track, an instantaneous relative position of the inclined reproducing track, in the longitudinal direction of the tape, with respect to the inclined recording track last scanned, which is partly overlapped by the inclined reproducing track, said first means generating position information representative of the determined instantaneous relative position; and second means for controlling, in dependence on the position information, the duration of activation of the tape drive device during a subsequent recording cycle for recording an information signal segment in an inclined recording track.

2. The arrangement as claimed in claim 1, for recording information signals formed by video signals, characterized in that the first means comprises:

time measuring means for determining a measurement value corresponding to a time interval between a head switch pulse edge of a head switch pulse generated at the beginning of a scan of an inclined reproducing track, and a line pulse edge of a line pulse reproduced from the inclined recording track which is partly overlapped by the inclined reproducing track; and comparison means for comparing the measurement value, determined by the time measuring means, with a nominal value corresponding to a nominal time interval, and for generating, in dependence upon the comparison result, the position information representative of the relative position of the inclined reproducing track, in the longitudinal direction of the tape, with respect to the inclined recording track which is partly overlapped by the inclined reproducing track.

3. The arrangement as claimed in claim 1, for recording information signals formed by video signals, characterized in that the arrangement further comprises a sensor device coupled to the at least one rotationally drivable magnetic head, said sensor device generating at least one sensor pulse per revolution of the at least one rotationally drivable magnetic head, and the first means comprises:

time measuring means for determining a measurement value corresponding to a time interval between a sensor pulse edge of a sensor pulse appearing during scanning of an inclined reproducing track and generated by said sensor device, and a line pulse edge of a line pulse reproduced from the inclined recording track which is partly overlapped by the inclined reproducing track; and comparison means for comparing the measurement value, determined by the time measuring means, with a nominal value corresponding to a nominal time interval, and for generating, in dependence upon the comparison result, the position information representative of the relative position of the inclined reproducing track, in the longitudinal direction of the tape, with respect to the inclined recording track which is partly overlapped by the inclined reproducing track.

4. The arrangement as claimed in claim 3, characterized in that said arrangement further comprises:

further time measuring means for determining a further measurement value corresponding to a time interval between a sensor pulse edge of a sensor pulse appearing during scanning of an inclined recording track to record a video signal segment forming an information signal segment, and a line pulse edge of a line pulse of the video signal segment forming the information signal segment to be recorded in the inclined recording track, whereby the arrangement generates the nominal value corresponding to the nominal time interval, the further measurement value forming this nominal value.

5. The arrangement as claimed in claim 1, characterized in that the second means controls, in dependence on the applied position information, the tape drive device with respect to the braking of the magnetic tape during a subsequent recording cycle for recording an information signal segment in an inclined recording track.

6. The arrangement as claimed in claim 5, characterized in that the second means controls, in dependence on the position information applied thereto, the tape drive device with respect to an occurrence of the instant at which braking of the magnetic tape begins during a subsequent recording cycle for recording an information signal segment in an inclined recording track.

* * * * *